(12) United States Patent
Flake et al.

(10) Patent No.: US 8,589,233 B2
(45) Date of Patent: Nov. 19, 2013

(54) ARBITRAGE BROKER FOR ONLINE ADVERTISING EXCHANGE

(75) Inventors: Gary W. Flake, Bellevue, WA (US); Brett D. Brewer, Sammamish, WA (US); Christopher A. Meek, Kirkland, WA (US); David Max Chickering, Bellevue, WA (US); Jody D. Biggs, Redmond, WA (US); Ewa Dominowska, Kirkland, WA (US); Brian Burdick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1509 days.

(21) Appl. No.: 11/763,542

(22) Filed: Jun. 15, 2007

(65) Prior Publication Data
US 2008/0103903 A1    May 1, 2008

Related U.S. Application Data

(60) Provisional application No. 60/862,969, filed on Oct. 25, 2006.

(51) Int. Cl.
*G06Q 30/00* (2012.01)
(52) U.S. Cl.
USPC ............ 705/14.71; 705/14.7; 705/14.69; 705/14.48; 705/14.46; 705/14.4; 705/14.49; 705/14.73; 705/400; 705/7.31
(58) Field of Classification Search
USPC ............ 705/14.71, 14.7, 14.69, 14.48, 14.46, 705/14.4, 14.49, 14.73, 14.42, 400, 7.31
See application file for complete search history.

(56) References Cited

U.S. PATENT DOCUMENTS

| | | | |
|---|---|---|---|
| 5,794,210 | A | 8/1998 | Goldhaber et al. |
| 5,855,008 | A | 12/1998 | Goldhaber et al. |
| 5,999,975 | A | 12/1999 | Kittaka et al. |
| 6,036,601 | A | 3/2000 | Heckel |
| 6,134,532 | A | 10/2000 | Lazarus et al. |
| 6,286,005 | B1 | 9/2001 | Cannon |

(Continued)

FOREIGN PATENT DOCUMENTS

| | | |
|---|---|---|
| EP | 1209600 | 5/2002 |
| JP | 2004-157585 A | 1/2002 |

(Continued)

OTHER PUBLICATIONS

International_Search_Report_dated_Feb. 12, 2008_for_PCT_ Application_Serial_No._PCTUS2007081840.

(Continued)

*Primary Examiner* — Michael Bekerman
*Assistant Examiner* — Luis Brown
(74) *Attorney, Agent, or Firm* — Shook, Hardy & Bacon L.L.P.

(57) ABSTRACT

For a multi-party online advertising exchange including advertising and publishing entities and one or more third party participants, the disclosed systems and methods enable third party participation in arbitrage opportunities in online advertising transactions. A plurality of underlying transaction details are abstracted and provided to the third party participants without loss of generalization and while preserving relationships in the transaction data, to enable a third party share risk in advertising transactions. Various system refinements are provided and disclosed according to a host of optional embodiments.

11 Claims, 11 Drawing Sheets

(56) References Cited

U.S. PATENT DOCUMENTS

| | | | |
|---|---|---|---|
| 6,324,519 B1* | 11/2001 | Eldering | 705/14.66 |
| 6,487,538 B1 | 11/2002 | Gupta et al. | |
| 6,808,173 B2 | 10/2004 | Snow | |
| 7,050,990 B1 | 5/2006 | Chu et al. | |
| 7,222,099 B2 | 5/2007 | Forsythe et al. | |
| 7,225,151 B1 | 5/2007 | Konia | |
| 7,496,943 B1 | 2/2009 | Goldberg et al. | |
| 7,577,582 B1* | 8/2009 | Ojha et al. | 705/26.3 |
| 7,630,986 B1* | 12/2009 | Herz et al. | 1/1 |
| 7,657,626 B1 | 2/2010 | Zwicky | |
| 7,680,715 B2* | 3/2010 | Waelbroeck et al. | 705/35 |
| 8,447,651 B1 | 5/2013 | Scholl et al. | |
| 2001/0020236 A1 | 9/2001 | Cannon | |
| 2001/0047297 A1 | 11/2001 | Wen | |
| 2002/0013167 A1 | 1/2002 | Spaur et al. | |
| 2002/0046157 A1 | 4/2002 | Solomon | |
| 2002/0049667 A1 | 4/2002 | Navani | |
| 2002/0062248 A1 | 5/2002 | Sakurai | |
| 2002/0082983 A1 | 6/2002 | Oshiba et al. | |
| 2002/0107779 A1 | 8/2002 | Maltzman | |
| 2002/0116302 A1 | 8/2002 | Wilmes et al. | |
| 2002/0120552 A1 | 8/2002 | Grey et al. | |
| 2002/0188487 A1 | 12/2002 | Fox | |
| 2003/0036975 A1 | 2/2003 | Martin et al. | |
| 2003/0120662 A1 | 6/2003 | Vishik | |
| 2003/0135460 A1 | 7/2003 | Talegon | |
| 2003/0149975 A1 | 8/2003 | Eldering | |
| 2003/0182413 A1 | 9/2003 | Allen et al. | |
| 2003/0187773 A1 | 10/2003 | Santos et al. | |
| 2004/0103024 A1 | 5/2004 | Patel et al. | |
| 2004/0117292 A1 | 6/2004 | Brumfield et al. | |
| 2004/0128224 A1 | 7/2004 | Dabney et al. | |
| 2004/0133492 A1 | 7/2004 | Stricker | |
| 2004/0148222 A1 | 7/2004 | Sabella et al. | |
| 2004/0181606 A1 | 9/2004 | Astor et al. | |
| 2004/0225576 A1 | 11/2004 | Mizuno et al. | |
| 2004/0254853 A1 | 12/2004 | Heene et al. | |
| 2005/0021441 A1 | 1/2005 | Flake et al. | |
| 2005/0027594 A1 | 2/2005 | Yasnovsky et al. | |
| 2005/0043998 A1 | 2/2005 | Bross et al. | |
| 2005/0065844 A1 | 3/2005 | Raj et al. | |
| 2005/0097024 A1* | 5/2005 | Rainey | 705/37 |
| 2005/0097204 A1 | 5/2005 | Horowitz et al. | |
| 2005/0119934 A1 | 6/2005 | Kamiyama | |
| 2005/0144068 A1 | 6/2005 | Calabria et al. | |
| 2005/0148377 A1 | 7/2005 | Goldberg et al. | |
| 2005/0177431 A1 | 8/2005 | Willis et al. | |
| 2005/0246231 A1 | 11/2005 | Shkedi | |
| 2005/0289005 A1 | 12/2005 | Ferber | |
| 2006/0004633 A1 | 1/2006 | Ashbaugh | |
| 2006/0026061 A1 | 2/2006 | Collins | |
| 2006/0026064 A1 | 2/2006 | Collins | |
| 2006/0041480 A1 | 2/2006 | Briggs | |
| 2006/0041500 A1* | 2/2006 | Diana et al. | 705/37 |
| 2006/0080171 A1 | 4/2006 | Jardins | |
| 2006/0095361 A1 | 5/2006 | Rude | |
| 2006/0122879 A1 | 6/2006 | O'Kelley | |
| 2006/0129467 A1 | 6/2006 | Chu et al. | |
| 2006/0136294 A1 | 6/2006 | Linden et al. | |
| 2006/0155597 A1 | 7/2006 | Gleason | |
| 2006/0155638 A1 | 7/2006 | de la Motte | |
| 2006/0161553 A1 | 7/2006 | Woo | |
| 2006/0173744 A1 | 8/2006 | Kandasamy et al. | |
| 2006/0174170 A1 | 8/2006 | Garland | |
| 2006/0212350 A1 | 9/2006 | Ellis et al. | |
| 2006/0248035 A1 | 11/2006 | Gendler et al. | |
| 2006/0248209 A1 | 11/2006 | Chiu et al. | |
| 2006/0271389 A1 | 11/2006 | Goodman et al. | |
| 2006/0271425 A1 | 11/2006 | Goodman et al. | |
| 2006/0271429 A1 | 11/2006 | Borgs et al. | |
| 2006/0271438 A1 | 11/2006 | Shotland et al. | |
| 2007/0011050 A1 | 1/2007 | Klopf et al. | |
| 2007/0027753 A1 | 2/2007 | Collins | |
| 2007/0027765 A1 | 2/2007 | Collins et al. | |
| 2007/0027771 A1 | 2/2007 | Collins et al. | |
| 2007/0027772 A1 | 2/2007 | Chou | |
| 2007/0033107 A1 | 2/2007 | Ubale et al. | |
| 2007/0038516 A1 | 2/2007 | Apple et al. | |
| 2007/0050254 A1* | 3/2007 | Driscoll | 705/14 |
| 2007/0061204 A1 | 3/2007 | Ellis et al. | |
| 2007/0067297 A1 | 3/2007 | Kublickis | |
| 2007/0100708 A1 | 5/2007 | Smith et al. | |
| 2007/0130005 A1 | 6/2007 | Jaschke | |
| 2007/0130009 A1 | 6/2007 | Steelberg | |
| 2007/0143186 A1 | 6/2007 | Apple et al. | |
| 2007/0150387 A1 | 6/2007 | Seubert et al. | |
| 2007/0179849 A1 | 8/2007 | Jain | |
| 2007/0192190 A1 | 8/2007 | Granville | |
| 2007/0192356 A1 | 8/2007 | O'Kelley et al. | |
| 2007/0198350 A1 | 8/2007 | O'Kelley et al. | |
| 2007/0198597 A1 | 8/2007 | Betz et al. | |
| 2007/0199017 A1 | 8/2007 | Cozen et al. | |
| 2007/0214045 A1 | 9/2007 | Subramanian | |
| 2007/0239535 A1 | 10/2007 | Koran et al. | |
| 2007/0239560 A1 | 10/2007 | McGuire | |
| 2007/0244760 A1 | 10/2007 | Bodnar et al. | |
| 2007/0260520 A1 | 11/2007 | Jha et al. | |
| 2007/0260596 A1 | 11/2007 | Koran et al. | |
| 2007/0271145 A1 | 11/2007 | Vest | |
| 2007/0276800 A1 | 11/2007 | Lee | |
| 2007/0294126 A1 | 12/2007 | Maggio | |
| 2008/0033776 A1 | 2/2008 | Marchese | |
| 2008/0097829 A1 | 4/2008 | Ritter | |
| 2008/0147487 A1 | 6/2008 | Hirshberg | |
| 2008/0154784 A1 | 6/2008 | Veeraraghavan | |
| 2009/0198684 A1 | 8/2009 | Collins et al. | |

FOREIGN PATENT DOCUMENTS

| | | | |
|---|---|---|---|
| JP | 2002117117 A | 4/2002 | |
| JP | 2002183506 A | 6/2002 | |
| JP | 2002352114 A | 12/2002 | |
| JP | 2003-187108 A | 4/2003 | |
| KR | 1020020012326 | 2/2002 | |
| KR | 1020020067941 | 8/2002 | |
| WO | WO0042593 A1 | 7/2000 | |
| WO | WO0140893 A2 | 6/2001 | |
| WO | 2004114083 A2 | 12/2004 | |
| WO | 0024484 A1 | 4/2005 | |
| WO | 07047310 A2 | 10/2005 | |
| WO | 2006110873 A2 | 10/2006 | |

OTHER PUBLICATIONS

OA_dated_Dec. 31, 2008_for_U.S. Appl. No. 11/675,343—34_pages.

OA_dated_Dec. 31, 2008_for_U.S. Appl. No. 11/735,753—35_pages.

OA_dated_Feb. 5, 2009 for_U.S. Appl. No. 11/747,963—34_pages.

OA_dated_Dec. 24, 2008_for_U.S. Appl. No. 11/753,790—30_pages.

OA_dated_Nov. 24, 2009_for_U.S. Appl. No. 11/762,632—17_pages.

OA_dated_Nov. 24, 2009_for_U.S. Appl. No. 11/742,199_-_16_pages.

OA_dated_Nov. 24, 2009_for_U.S. Appl. No. 11/735,737—16_pages.

OA_dated_Dec. 7, 2009_for_U.S. Appl. No. 11/864,481—pages.

OA_dated_Dec. 10, 2009_for_U.S. Appl. No. 11/748,333_14_pages.

Final OA_dated_Dec. 24, 2009_for_U.S. Appl. No. 11/747,968_15 pages.

OA_dated_Jan. 25, 2010_for_U.S. Appl. No. 11/675,343_15_pages.

Notice_of_Allowance_dated_Jan. 15, 2010_for_U.S. Appl. No. 11/747,963_25_pages.

OA_dated_Jan. 29, 2010_for_U.S. Appl. No. 11/753,790_15_pages.

OA_dated_Nov. 24, 2009_for_U.S. Appl. No. 11/735,742—18_pages.

(56) References Cited

OTHER PUBLICATIONS

Bae, et al. "The Profitability of Index Futures Arbitrage: Evidence from Bid-Ask Quotes," http://home.ust.hk/~kachan/research/arbitrage.pdf, MAy 1998, 32 pages.

"Index-Futures Arbitrage and the Behavior of Stock Index Futures Prices," http://press.princeton.edu/books/lo/chapt11.pdf, last accessed Apr. 4, 2007.

"Arbitage Opportunties, Brokerage, Finance businesses, miscellaneous,"http://www.experienced-people.co.uk/1042-top-ways-of-making-money-online/5-last-but-not-least.htm, last accessed Apr. 4, 2007.

Bjorn Knutsson. Peer-to-Peer Support for Massively Multiplayer Games. Jul. 4, 2004. http://www.cs.ualberta.ca/~anup/Courses/604/Presentation_files/Lihang/P2Pgames_infocom04_Upenns.pdf.

Monty Giaveli. Connect 2.01. Sep. 5, 2005. http://www.allworldsoft.com/software/4-906-connect.htm.

Haring. "The Virtual Location of E-Tailers: Evidence from a B2C E-Commerce Market" (2005) ZEW (Centre for European Economic Research) Discussion Paper No. 05-52, 26 pages.

Madani, et al. "Contextual Recommender Problems" (2005) ACM, pp. 86-89.

Lan Zhao, et al., "A network modeling approach for the optimization of Internet-based advertising strategies and pricing with a quantitative explanation of two paradoxes", Aug. 31, 2007, 2 pages http://portal.acm.org/citation.cfm?id=1188190.

Final OA_dated_December_Apr. 12, 2010_for_U.S. Appl. No. 11/735,753.

Final OA_dated_December_May 12, 2010_for_U.S. Appl. No. 11/735,742.

Final OA_dated_December_Jun. 21, 2010_for_U.S. Appl. No. 11/742,199.

NF_OA_dated_December_Jun. 24, 2010_for_U.S. Appl. No. 11/762,632.

Final OA_dated_December_Jun. 8, 2010_for_U.S. Appl. No. 11/748,333.

NF OA_dated_December_May 26, 2010_for_U.S. Appl. No. 11/864,481.

NF OA_dated_December_Apr. 13, 2010_for_U.S. Appl. No. 11/747,968.

OA_dated_December_Aug. 16, 2010_for_U.S. Appl. No. 11/753,790.

Final OA_dated_December_Apr. 8, 2010_for_U.S. Appl. No. 11/762,625.

Final OA_dated_December_Apr. 12, 2010_for_U.S. Appl. No. 11/762,243.

Final OA_dated_December_May 25, 2010_for_U.S. Appl. No. 11/735,737.

OA_dated_December_Aug. 23, 2010_for_U.S. Appl. No. 11/675,343.

First OA_dated_December_May 11, 2010_for_U.S. Appl. No. 11/753,784.

Final Office Action U.S. Appl. No. 11/675,343, mailed: Feb. 1, 2011, 22 pages.

Final Office Action U.S. Appl. No. 11/753,790, mailed: Feb. 2, 2011, 13 pages.

NonFinal Office Action in U.S. Appl. No. 11/735,753, mailed Nov. 6, 2012, 14 pages.

NonFinal Office Action in U.S. Appl. No. 11/762,243, mailed Dec. 10, 2012, 10 pages.

NonFinal Office Action dated Feb. 4, 2013 for U.S. Appl. No. 11/735,742, 50 pages.

NonFinal Office Action dated Mar. 26, 2013 for U.S. Appl. No. 11/762,632, 37 pages.

Final Office Action dated Mar. 12, 2013 for U.S. Appl. No. 11/753,790, 27 pages.

Final Office Action, mailed Dec. 7, 2010, U.S. Appl. No. 11/864,48, 29 pp.

Final Office Action, mailed Feb. 1, 2011, U.S. Appl. No. 11/675,343, 29 pp.

Final Office Action, mailed Feb. 2, 2011, U.S. Appl. No. 11/753,790, 21 pp.

Final Office Action dated Nov. 8, 2010 for U.S. Appl. No. 11/753,784.

Final Office Action dated Nov. 23, 2010 for U.S. Appl. No. 11/762,632.

Final Office Action dated Oct. 27, 2010 for U.S. Appl. No. 11/747,968.

Final Office Action dated Oct. 27, 2010 for U.S. Appl. No. 11/735,753.

Final OA dated Apr. 10, 2013 for U.S. Appl. No. 11/762,243.

Notice of Allowance re U.S. Appl. No. 11/762,625, dated May 8, 2013.

Final in U.S. Appl. No. 11/735,753 Mail Date: May 6, 2013.

Final OA dated Jun. 18, 2013 for U.S. Appl. No. 11/735,742.

* cited by examiner

ARBITRAGE BROKER FOR ONLINE ADVERTISING EXCHANGE

CROSS REFERENCE TO RELATED APPLICATIONS

This application claims priority to U.S. Patent Application Ser. No. 60/862,969, filed on Oct. 25, 2006, entitled "DISTRIBUTED ARCHITECTURES FOR ONLINE ADVERTISING", the entirety of which is incorporated herein by reference.

TECHNICAL FIELD

The subject disclosure relates to systems and methods for third party participation in arbitrage opportunities in online advertising transactions in online advertising architectures and environments.

BACKGROUND

Historically, large web search engines have sold advertising space based on keyword-driven search results. For example, Yahoo! conducts auctions for certain keywords, and the highest bidder(s) have their ads placed on pages containing Yahoo! search results, or they obtain preferred placement among the search results, i.e., at the top of the results list.

As web advertising develops, a number of companies are now acquiring large publisher bases from which they can sell advertisement placements. Specifically, Google is signing up publishers into their AdSense ad network. Advertisers pay Google to serve advertisements to participants of the AdSense network. Google then pays some or all of the advertising revenue to the individual publishers. For example, a publisher in the AdSense network may have an article on its website that talks about digital cameras, and Google's AdSense would display digital camera advertisements from advertisers in the AdSense network on that website. Google would auction off the "digital camera" keyword to advertisers in its AdSense network and display ads from the highest bidder(s).

There are a number of problems with this proprietary ad network model. First, companies that are building ad networks have an inherent conflict of interest because they represent both the publisher and the advertiser. Second, because there are multiple companies that are creating ad networks, advertisers have the burden of managing buys across many ad networks, which results in significant cost and complexity to the advertiser. Third, because publishers are for all practical purposes locked into a single ad network, the advertiser competition is limited, which results in lower return for the publishers. Fourth, the lack of general standards around terms and conditions, and behavioral segmentation is a major obstacle to reaching the full market value of online display advertising. There is also no current standardization across publishers for accepted media types and ad formats. Fifth, smaller publishers currently have very little power individually, even if they serve a hard-to-reach audience. Sixth, ISPs and other owners of large user databases are not realizing the full value of the information they have due to privacy concerns and lack of a proper marketplace. Finally, the types of participants and transactions possible are limited by the rigid framework of a proprietary ad network model. As a result, there is currently no way for a third party to intervene in an online advertising transaction, and share the risk of the result of the transaction with one or more participants of the transaction (e.g., the publisher, advertiser, or their representatives).

For instance, if one party is only willing to pay $1/impression, but a third party, due to unique insight on the transaction details (e.g., from statistical information, knowledge of a trend, pattern matching etc.), sees that the impressions will yield a lot more for the advertiser (e.g., which would typically cause an advertiser to bid $10 for the same impression), today, there is no way for the third party to share in the risk and reward of the transaction and monetize that insight.

Although certain concerns may be met by the rigid framework of a proprietary ad network model where a central entity can act to shield participants' activities from their competitors and keep end-user ad viewer details from the advertisers and publishers, as will be described in detail below, such concerns as preserving individual user privacy, shielding advertisers and publishers business data and decisions from competitors, and preserving propriety advertising exchange information can be met by the disclosed systems and methods while providing the benefits of third party participation in the exchange.

The above-described deficiencies of current advertising environments are merely intended to provide an overview of some of the problems of today's advertising environments, and are not intended to be exhaustive. Other problems with the state of the art may become further apparent upon review of the description of various non-limiting embodiments of the invention that follows.

SUMMARY

In view of the above-described deficiencies in current proprietary advertising architectures, according to various non-limiting embodiments, the invention provides an arbitrage broker that plugs into a federated online advertising exchange. According to one embodiment, the arbitrage broker is able to profit from facilitating online advertising transactions by bearing risk of online advertising transactions. For instance, an arbitrage broker can buy apparently undervalued inventory by taking advantage of insight such as statistical insight, recognized trends, or other available or created insights, and then reap the reward of a successful transaction (e.g., a conversion).

According to further non-limiting embodiments, the arbitrage broker can use external data or statistical insights in order to gain insight into the success of a pending online advertising transaction. Although such may be obtained external to the online advertising exchange, according to a further non-limiting embodiment, such data or insights may come from within the online advertising exchange.

In order to preserve the privacy of online advertising exchange participants, the integrity of proprietary online exchange data, and the privacy of the end-user ad viewer while providing access to arbitrage opportunities, according to a further non-limiting embodiment, the invention provides techniques for creating statistical blobs (e.g., via a one way hash) of a plurality of demographic or other transaction data which preserves hierarchical distance so that the data can be analyzed without revealing critical privacy information to the arbitrage broker.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

Various embodiments of the systems and methods for third party participation in online advertising transactions in accordance with the present invention are further described with reference to the accompanying drawings in which.

DETAILED DESCRIPTION

Overview

Figure 1:
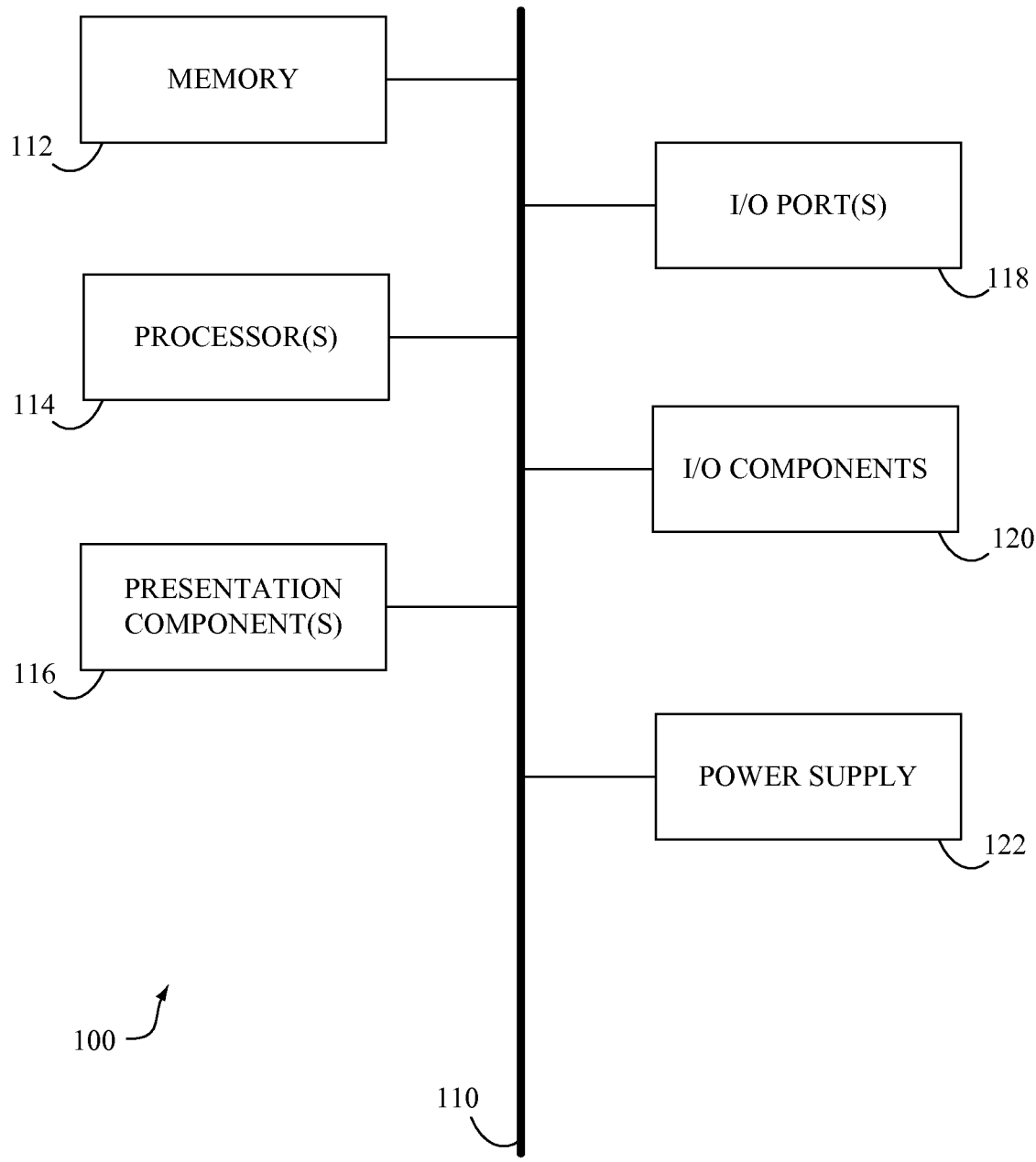
FIG. 1 is a block diagram of a computing system environment suitable for use in implementing the present invention.

In various non-limiting embodiments, the invention is described in the context of a distributed architecture for online advertising, e.g., a market mechanism that manages the exchange of advertising goods among multiple participants on the advertising and/or publishing side. For instance, for a multi-party advertising exchange, the invention enables a third party to participate and share risk and reward in an advertising transaction. This allows a transaction between participants (e.g., an advertiser and publisher), that would otherwise not occur due to a failure to agree on price for the placement of an advertisement (e.g., a bid-ask gap).

Overall, increasing the amount of knowledge of parties to a transaction makes for a more efficient transaction since knowledge can reduce uncertainty and risk in decision making by the parties. However, in some respects, a party having a key piece of knowledge about a prospective transaction and its chances of success (e.g., a conversion) may not be the advertiser or the publisher, but may be another third party. As a result, the advertising transaction may not occur without the intervention of the third party, because of a disagreement on ad placement price. To that end, the invention increases the ability of third party participants to an advertising exchange to intervene in what would otherwise be an impasse, by enabling the third party to take some risk in making up the bid-ask gap in return for some measure of reward (e.g., payment that would normally accrue to a publisher conversion). As a result, the advertising marketplace is more liquid because of the incentive to discover and bring to the exchange key pieces of information about pending transactions between individual participants, which yields a more efficient marketplace for all.

In various non-limiting embodiments, an advertising system to facilitate third-party participation in arbitrage opportunities in the trading of advertising includes (A) a publisher broker to represent publishers that determines an ask for an advertisement space on the publishers' inventory, such as a webpage, (B) an advertiser broker to represent advertisers that manages the advertisers' bids for the advertisement space, (C) an exchange to facilitate a transaction for the advertisement space between the publisher broker and the advertiser broker and enable other information providers or value-add providers to increase the availability of transactional information to the system, and (D) an arbitrage broker able to plug in to the exchange to enable a third party to share in the risks and rewards of an advertising transaction by exploiting the third party's insights into a pending transaction.

Accordingly, the invention can be used in the non-limiting scenario discussed in the background. Namely, if one party is only willing to pay $1/impression, but a third party, due to unique insight on the transaction details (e.g., from statistical information, knowledge of a trend, pattern matching etc.), sees that the impressions will yield a lot more for the advertiser (e.g., which would typically cause an advertiser to bid $10 for the same impression), in accordance with the invention, the third party is able to share in the risk and reward of the transaction and monetize that insight.

As a further example, suppose there is a 1/1000 chance for converting on an impression and a conversion is worth $1000 (e.g., the advertiser, advertiser's representative, or other intermediary would be paid this amount on successful click-through and purchase). Then, it would be rational for the advertiser, in order to break even, to pay no more than $1/impression. Further suppose that a publisher (or publisher's representative) will only accept $10/impression, for whatever reason. As a result, without more, the transaction would not occur due to disagreement on pricing. However, with the invention, an arbitrage broker discussed in more detail below bridges that gap.

Specifically, with the invention, if a third party (e.g., an arbitrage broker), as a result of some statistical information (or other available insight) sees that this particular set of customers (e.g., customer impressions) is actually worth $10/impression due to a high likelihood of conversion, then the arbitrage broker is able to make money by buying into the transaction, taking advantage of the temporary mis-pricing based on insufficient information, thereby profiting from the move. As a result of financing the temporary pricing mismatch and making the advertising transaction possible, the arbitrage broker is able to share in the reward by receiving some portion of the $1000 due on successful conversion. As a result, the advertising marketplace is more liquid because of this incentive to discover and bring to the exchange key pieces of information about pending transactions between individual participants, which yields a more efficient marketplace for all.

In one aspect, the invention provides an arbitrage broker that plugs into a federated online advertising exchange. According to one embodiment, the arbitrage broker is able to profit from facilitating online advertising transactions by bearing risk of transactions. For instance, an arbitrage broker can buy apparently undervalued inventory by taking advantage of such insight as acquired statistical insight, recognized trends, or other available or created insights, and then reap the reward of a successful transaction (e.g., a conversion).

According to further non-limiting embodiments, the arbitrage broker uses external data or statistical insights in order to gain insight into the success of a pending online advertising transaction. Although such data or insights may be obtained external to the online advertising exchange, according to a further non-limiting embodiment, the data or insights may come from within the online advertising exchange.

In order to preserve the privacy of online advertising exchange participants, the integrity of proprietary online exchange data, and the privacy of the end-user ad viewer while providing access to arbitrage opportunities, according to a further non-limiting embodiment, the invention provides techniques for creating statistical blobs (e.g., via a one way hash) of a plurality of demographic or other transaction data which preserves hierarchical distance so that the data can be analyzed without revealing critical privacy information to the arbitrage broker.

A simplified overview has been provided in the present section to help enable a basic or general understanding of various aspects of exemplary, non-limiting embodiments that follow in the more detailed description and the accompanying drawings. This overview section is not intended, however, to be considered extensive or exhaustive. Instead, the overview presents some concepts related to some exemplary non-limiting embodiments of the invention in a simplified form as a prelude to the more detailed description of these and various other embodiments of the invention that follow.

Exemplary Operating Environment(s)

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated. In accordance with the invention, participants can communicate with an advertising exchange via one or more computing devices 100, and the advertising exchange may also comprise one or more computing devices 100, in order to carry out one or more aspects of the invention described in detail below.

In this regard, the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory, or otherwise communicate with memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Exemplary Architecture(s) for Online Advertising

Figure 2:
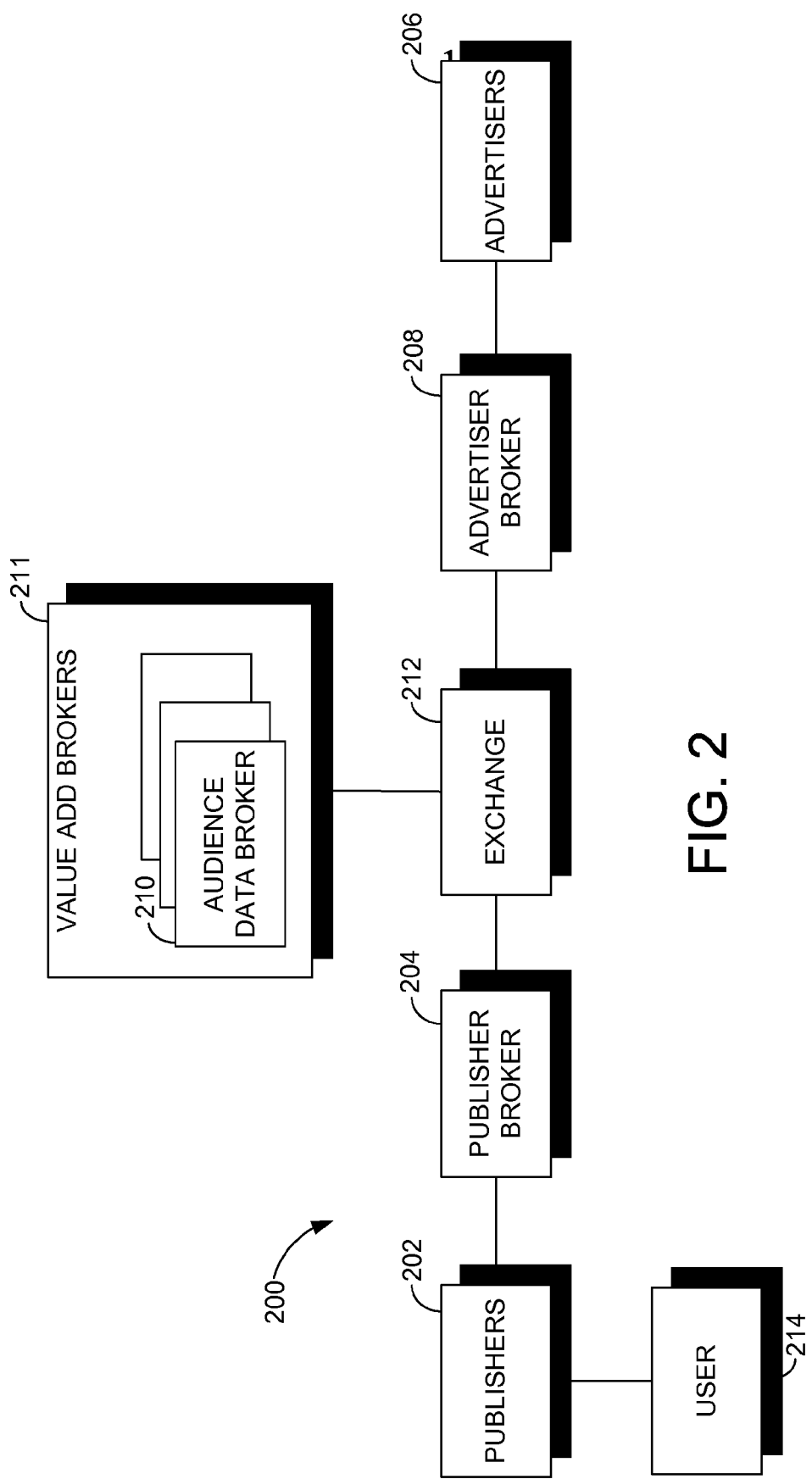
FIG. 2 illustrates a distributed architecture for online advertising, according to embodiments of the present invention.

Exemplary online advertising environments or architectures in which one or more of the various embodiments of the systems and methods for third party participation in online advertising transactions of the present invention may be deployed or implemented are now described. For instance, FIG. 2 illustrates an exemplary distributed architecture 200 for online advertising, which comprises publishers 202. For purposes of explanation only, publishers 202 will be discussed herein as a group of any number of publishers. However, embodiments of the present invention are not limited to a group of publishers, as a single publisher is sufficient. Also, embodiments of the present invention are not limited to a single group of publishers, as any number of groups of publishers may be present in architecture 200.

In an embodiment, each publisher is a content provider. For example, a construction worker who operates a single page website on which he posts a weblog (blog) may be a publisher. In another example, a media company such as Disney, who operates a huge website with many pages of content may also be a publisher. Publishers 202 is intended to represent any number of types, sizes, sophistication levels, etc. of publishers. In an embodiment, publishers 202 desire to sell advertisement space on their websites to advertisers 206 (discussed below).

Architecture 200 also comprises publisher broker 204. For purposes of explanation only, only one publisher broker will be discussed herein. However, embodiments of the present invention are not limited to a single publisher broker, as any number of publisher brokers may exist. In an embodiment, publisher broker 204 is an aggregator of publishers. Specifically, publisher broker 204 is an entity that represents publishers 202 with the goal of maximizing ad revenue, ensuring quality ads, etc. Publisher broker 204 breaks the conflict of interest that is inherent in systems such as Google's AdSense by solely focusing on managing publishers 202's yield. Publisher broker 204 allows small and mid-size publishers (such as those that may be represented by publishers 202) to aggregate in order to drive higher yield for themselves. In an embodiment, publisher broker 204 maintains a user interface through which it interacts with publishers 202 and through which it manages publishers 202's preferences.

In an embodiment, publisher broker 204 comprises a publisher center and a publisher delivery system. The publisher center allows publishers to manage their preferences. The publisher delivery system is used to calculate the ask for a given page view on the publisher's site, and potentially enrich the available user data in the request. In an embodiment, the ask is an asking price. However, embodiments are not so limited, as the ask may be, e.g., a minimum cost-per-click, minimum relevance, some other performance metric, etc.

The publisher center establishes traffic inventory groupings in the system and sets asks. When a user makes a page request to the publisher, the publisher populates their page with some scripting that sets up a call to the publisher broker. The publisher may add in some information about the user to the call to the publisher broker (the incentive would be that more publishers would want to use a publisher broker that had this sort of value added service). The publisher broker determines what the ask should be for a particular request, given the user information present, the inventory grouping that the request falls into, and the rules the publisher has set up around that information. Additionally, the publisher broker will pass along the maximum amount that the publisher is willing to pay to have any unknown data attributes about the user populated for this request. Finally, the publisher broker encodes this information into a request URL that it sends back to the user as a redirection URL. When all transactions have occurred in the exchange (see below), a call back is provided to the publisher broker stating whether and how many ads were displayed, what the publisher broker can expect in terms of a payment, and which incremental attributes about the user were filled by an audience broker (see below).

Architecture 200 also comprises advertisers 206. For purposes of explanation only, advertisers 206 will be discussed herein as a group of any number of advertisers. However, embodiments of the present invention are not limited to a group of advertisers, as a single advertiser is sufficient. Also, embodiments of the present invention are not limited to a single group of advertisers, as any number of groups of advertisers may be present in architecture 200.

In an embodiment, each advertiser purchases ad space on websites. For example, a local businessperson who operates a website for her small flower shop and who advertises on a neighborhood homeowners' association website may be an advertiser. In another example, a massive corporate entity such as General Motors, which has thousands of products and services, and which advertises on thousands of automotive-related websites may also be an advertiser. Advertisers 206 is intended to represent any number of types, sizes, sophistication levels, etc. of advertisers. In an embodiment, advertisers 206 desire to pay money to place ads on publishers 202's websites.

Architecture 200 also comprises advertiser broker 208. For purposes of explanation only, only one advertiser broker will be discussed herein. However, embodiments of the present invention are not limited to a single advertiser broker, as any number of advertiser brokers may exist. In an embodiment, advertiser broker 208 is an aggregator of advertisers. Specifically, advertiser broker 208 is an entity that represents advertisers 206 with the goal of optimizing advertisers 206's spending and placing monetary values on displaying advertising of a particular format, on a particular website, to a particular audience. In an embodiment, advertiser broker 208 maintains a user interface through which it interacts with advertisers 206, and through which it manages advertiser's 206 preferences, such as preferences for particular user data attributes. However, embodiments of the present invention are not limited to any particular advertiser preferences.

In an embodiment, an advertiser sets up ads in the advertiser broker system, but has no further interaction with the exchange (see below) or end user until such a point as the end user clicks on their ad. This means that the advertiser does not see any user attributes that have been populated by audience data brokers (see below) as part of the exchange transaction. In an embodiment, the exchange (see below) carries enough information to allow for advertisers to setup self-optimizing campaigns based only on landing URLs, creatives, and campaign goals. Similarly, algorithms can be run on advertiser landing URLs to choose possible subsets of audience attributes as well as relevant topics (keywords, categories, and content pages). The available features can then be selected to maximize the campaign goals, for example branding campaigns would minimize the amount paid per impression and maximize the coverage and inventory quality. A sales campaign on the other hand would be selected to track conversions and maximize the number of high value conversions for the existing advertiser budget.

Architecture 200 also comprises a value add broker 211, which can be any entity which adds value (e.g., additional transaction information) as a third party to the advertiser-publisher transaction in the exchange. Such additional value can be provided in the form of audience data, statistics or trends about the advertising market, market participants, an audience member, external markets (e.g., retail toy markets), from whatever source (e.g., businesses, individual audience members, search statistics providers, audience data brokers, arbitrage brokers, trends brokers, other information brokers either distributed or localized or a combination thereof), either in exchange for a benefit (e.g., monetary profit by direct or indirect payments, price discounts on current or future ad transactions, price discounts on the underlying product or service to the audience member(s), coupons, options, futures, or any other benefit whatsoever), or provided freely to the exchange.

For purposes of explanation only, only one value add broker in the form of an audience data broker 210 will be presently discussed. However, embodiments of the present invention are not limited to a single value add broker (e.g., single audience data broker), as any number and combination of value add brokers may exist. In an embodiment, audience data broker 210 is an aggregator of user data providers. A user data provider is any entity that maintains any partial information that can be referred back to an individual user (such as one of users 214, discussed below) for advertising purposes. For example, user data may comprise demographic, psychographic, and behavioral information. More specifically, for example, user data may comprise age, gender, wealth index, interests, shopping habits, etc. However, embodiments of the present invention are not limited to any specific type of user data. In an embodiment, audience data broker 210 is any large user data aggregator, such as PayPal, Visa, Yahoo!, Verizon, as well as an aggregate of smaller user data providers. Any online store that collects user data can function as audience data broker 210 by providing user location level and user purchase pattern level information. This information can be aggregated with demographic profiles from small web email providers to form more comprehensive user descriptions.

In an embodiment, audience data broker 210 enriches information regarding a user viewing one of publishers 202's web pages. In an embodiment, audience data broker 210 does not disclose any personally identifiable information about the user. In an embodiment, audience data broker 210 accomplishes this by performing a private user ID lookup and passing back a set of aggregate user attributes that could be consumed by advertisers 206 and advertiser broker 208. This user attribute enrichment increases the value of the display of the ad to advertisers 206, helps produce more relevant ads to consumers, and creates a more complete picture of the user for ad serving purposes without violating the user's privacy. The aggregation across different providers serves two independent roles, in an embodiment: (1) it creates a comprehensive view of the audience landscape, and (2) it thickens the data sources to allow for anonymization and preservation of user privacy.

In an embodiment, audience data broker 210 receives direct payment for even small and/or partial user attributes. By participating in architecture 200, audience data broker 210: (1) is paid for its information, (2) can enrich its information (even redundant data providers are useful for scoring purposes), and (3) can verify its information (providers with poor quality of data will gain insight and will be able to actively address data quality issues). In an embodiment, audience data broker 210 receives a request from publisher broker 204 proxied by exchange 212 (explained in greater detail below). Audience data broker 210 appends known user attributes into this request for the consumption of advertiser broker 208. In an embodiment, Audience data broker 210 does not know the page that the user is on from publisher broker 204, and audience data broker 210 will not pass any user identifiers to advertiser broker 208.

In an embodiment, audience data broker 210 comprises a user data recorder to record user information into the exchange (discussed below) and a user data delivery system to respond to requests for the user information. In an embodiment, the user data recorder informs the exchange that the audience data broker knows something about a user, through whatever means that may be. To do this, when the audience data broker has contact with a user that they know something about, the audience data broker can either set up a single pixel gif call to the exchange that the user will perform, or the audience data broker can redirect the current user request to the exchange, along with the information and a destination URL for the exchange to redirect the user to afterwards. In each case, whatever information or data key the audience data broker wishes to receive back is expected to be enough so that the audience data broker can answer user data delivery system requests for the use. In an embodiment, the information passed to the exchange is signed in a manner that proves the identity of the audience data broker to the exchange. In an embodiment, the exchange, upon verifying the identity of the audience data broker, will set a cookie to the user's browser with the name of the cookie identifying the audience data broker, and the cookie value being the information provided. In an embodiment, when the exchange receives an ad request from a user (the user having been sent to the exchange from a publisher broker), if there are any user data attributes that the publisher is willing to pay an additional amount for, then the cookies for all audience data brokers are read from the user's browser. For each audience data broker identified by a cookie, if the audience data broker is currently live, the exchange will send a request to that audience data broker with the cookie value and any unknown data attributes which the publisher is willing to pay to have provided. The audience data broker then responds back, including the information for as many attributes as they know, along with the price they are asking for to allow it to be used.

In an embodiment, audience data brokers can participate in an advertiser auction and get paid directly through an advertiser bid with no audience data requests from the publisher broker. This would be considered a "publisher blind" audience data delivery. If an advertisement bid meets and exceeds a publisher requested minimum, then the bid remainder left after publisher ask can be used to acquire user data and maximize advertiser ROI (return on investment) using tighter targeting. The exchange provides a call back to the winning audience data broker(s) letting them know what attributes they won on, and what amount they will be paid for that information.

Given that publishers and advertisers can apply payments directly to audience data brokers for specific information, in an embodiment, there is a verification and rating process for audience data brokers. Multiple audience data brokers will be competing for the same service. In an embodiment, competition is performed based on ask, but also based on quality of data. Advertisers will have transparency into the publisher broker network, and similar transparency can be offered into the audience data broker network by offering a rating system. Audience data broker ratings can be calculated dynamically through the use of overlapping collection symbols. Overlapping data could be used to calculate ground truth predictions as well as verify the data provided by individual audience data brokers. This information in turn could be used to automatically rate audience data brokers. In an embodiment, a simple voting system can be used to verify the accuracy of any specific collection symbols for each broker, or the quality of the broker as a whole. The maintainers of the exchange would be responsible for publishing the voting consensus to the public, or to disbar the broker completely if necessary.

In an embodiment, no audience data broker will be able to provide ground truth data for all users. However, it might be possible to generate such data by creating data functions based on different providers and choosing the consensus opinion for each attribute. Publishers and advertisers could choose to use the consensus opinion or any individual audience data broker's collection symbols. In an embodiment, data units of "statistically significant" user data attributes could be created. Most audience data brokers often run into privacy issues not due to the data they have, but due to the data they don't know. Holes in a user profile could be significant or unique enough to be carrying sufficient information to reconstruct a unique user. Filling-in these holes using data from other user data providers could allow those providers to generate statistically significant aggregates that can be used for research purposes without sacrificing user privacy.

Architecture 200 also comprises exchange 212. Exchange 212 acts as a mediator among publisher broker 204, advertiser broker 208, and audience data broker 210. Exchange 212 is the framework that allows publisher broker 204 to have its ads enriched with additional user data by audience data broker 210. In an embodiment, exchange 212 routes traffic and facilitates transactions, e.g., auctions, between publisher broker 204, advertiser broker 208, and audience data broker 210. In an embodiment, exchange 212 is a server or a set of servers. Exchange 212 creates a system in which audience data broker 210 can monetize its data and in which advertiser broker 208 can reach a larger audience of more highly targetable traffic. In an embodiment, exchange 212 provides minimum standards of conformity, ensuring that some base information about the request is provided to be used by advertiser broker 208, regardless of population data from publisher broker 204 and audience data broker 210.

To provide minimum standards of conformity, in an embodiment, exchange 212 provides collection symbols related to the category of the publisher's page, the meaningful keywords in it, as well as geo-location information extracted from the user's IP address. The base data, such as the user IP address, the URL of the publisher's page, and any other such information deemed relevant should also be provided to each advertiser broker so that the advertiser broker may attempt to extract additional information to provide value-added services to the advertisers they service. In an embodiment, exchange 212 sends all publisher broker requests that match a set of criteria defined by the advertiser broker, along with all relevant data about the request (e.g., the ask and collection symbols provided by the publisher, audience broker, and the exchange itself). In an embodiment, if the advertiser broker has any ads that it would like to have displayed and that meet the ask, it returns those ads, up to the number of ads requested, along with a CPI (cost per impression) bid on each. However, embodiments are not limited to CPI pricing, as other pricing models may be used, e.g., CPC (cost per click), CPA (cost per acquisition), CPM (cost per thousand impressions), and revenue sharing. Exchange 212 provides a call back to the winning advertiser broker(s) telling it which ads were displayed, and at what prices.

Architecture 200 also comprises users 214. For purposes of explanation only, only one user will be discussed herein. However, embodiments of the present invention are not limited to a single user, as any number of users may exist. Users 214 request a webpage from publishers 202. The webpage comprises content and advertisement space, which is filled with advertisement(s) from advertisers 206.

Using architecture 200, audience data can be provided to advertisers 206 either by enriching the publishing property with customer intelligence or by acquiring the data directly from audience data broker 210 on the basis of a licensing fee. Advertiser broker 208 can choose to pay an estimated monthly per volume amount for each attribute that their advertisers are interested in targeting. This transaction could be done off-line but would need to be registered with exchange 212 to facilitate data rerouting at request time. Advertiser broker 208 can base its bids on any targeting attributes provided by audience data broker 210. For example, advertisers 206 may place base bids either on a CPC or CPM basis and have the option to incrementally bid for any attribute values exposed to them. Advertiser broker 208 is free to pay higher rates for redundancy or higher data quality. Advertiser broker 208 may manage the risk surrounding assessing individual advertiser performance and converting all bid types to CPI for final ranking by exchange 212. In an embodiment, the pricing model is similar to the pricing models discussed above.

In an embodiment, when publishers 202 have an impression that they are willing to sell (with an optional ask), they can provide a URL and any targetable values to exchange 212. Exchange 212 passes this data and possible additional user data from audience data broker 210 to advertiser broker 208. In an embodiment, advertiser broker 208 ranks the bids of advertisers 206 using any proprietary attributes or techniques that it finds useful. For example, advertiser broker 208 could choose to run keyword extraction or categorization and use this for targeting. Advertiser broker 208 would output a CPI ranked list of advertisers (in an embodiment, the number would be equal to the number of ads requested by the publisher), where the CPI value would already be stripped of any costs used for purchasing audience data. In an embodiment, where multiple advertiser brokers exist, exchange 212 then ranks all ads across all advertiser brokers and chooses the best one (as measured by CPI). If these ads meet or exceed the publisher ask, then exchange 212 proxies a display of the ads on the publisher website.

A second-price auction can still be applied to facilitate aggressive bidding. Publishers 202 can get paid on a CPI basis. Ad impressions are logged to be used for traffic volume calculations used for audience data licensing. In an embodiment, exchange 212 may be used to gate user information originating from publishers 202. Publishers 202 can choose to enrich their property with user data and share this information only with selected advertiser brokers.

To facilitate participants of all types to become part of architecture 200, it may be desirable to establish a pricing model that is extremely flexible, yet at the same time does not change the industry paradigm so greatly as to create confusion that would prevent potential participants from joining architecture 200. Advertisers are already accustomed to both CPC and CPM pricing, with a small but increasing market for CPA (cost per acquisition) pricing. Publishers tend to prefer CPM pricing, and the larger, more complex publishers sell traffic broken down by user demographics and in other ways. Smaller publishers generally have to accept what they can get, which often results in CPC or CPA pricing. Profile owners, such as audience data brokers, have not typically been able to capitalize on their data, and when they have, have done so in flat transactions for aggregate data.

To support the flexibility of all of these pricing models, and even to allow for others in the future, in an embodiment, exchange 212 is based on a CPI model between publisher broker 204 and advertiser broker 208, where, on each request, publisher broker 204 will set a minimum ask, i.e., reserve price, for their available ad space, and advertiser broker 208 will place a bid on the right to have their ads displayed on this request. As discussed above, embodiments are not limited to CPI pricing only. Exchange 212 will take a small portion of the revenue flowing through it to support its operations, which can either be implemented via incrementing the publisher ask by some percentage, or by making agreements with publishers 202 that some percentage of the revenue generated from their traffic will be held back.

Because publishers 202 are concerned with user satisfaction, they would prefer to have some control over the relevancy of the ads placed on their site. Click-through rate is considered a good measure of relevance and therefore many publishers might want minimum click-through guarantees on the ads. Exchange 212 allows publishers 202 to optionally specify a minimum click-through rate that is acceptable. Exchange 212 monitors advertiser broker 208 to make sure that if it wins these types of asks, then it is meeting the performance guarantees. In an embodiment, if an advertiser broker consistently provides low click-through rates for publisher asks that require a minimum, exchange 212 may take punitive measures such as suspension from the system.

Advertiser broker 208 is responsible for converting any externally facing pricing models it allows into the CPI bid on each request. For example, a simple CPC to CPI conversion would be to multiply the per click bid of each ad by the expected click through rate of the ad for the conditions present. Similarly, to convert a CPA bid to CPI, advertiser broker 208 could multiply the conversion rate by the per conversion bid of the advertiser. The more information available in each request, the better job advertiser broker 208 can potentially do in predicting the probability of a click or a conversion. Since it is expected that advertiser broker 208 will therefore desire additional information along with each request to help it predict what those probabilities are, as well as to allow the advertiser to express a preference for one or another of those attribute values by bidding differently, they will want to have information from audience data broker 210 at request time. The pricing model between audience data broker 210 and advertiser broker 208 will be a market, where audience data broker 210 sets minimum guarantee asks, as well as CPM pricing rates. In an embodiment, advertiser broker 208, if it wishes to use audience data broker 210's information, will agree to pay the greater of the guarantee amount or the CPM rate for the number of ad impression auctions that it wins. Exchange 212 is necessary to this transaction so as to track the number of ad impression auctions advertiser broker 208 wins, as well as to query for an attach audience data broker 210's user information to the request sent to advertiser broker 208.

The entity hosting exchange 212 has access to all data sources, giving it the power to make partial decisions. To alleviate the concern that exchange 212 will not be impartial both as hosting body and as a direct participant, in an embodiment, transparency will be built into exchange 212. In that embodiment, exchange 212 does not have a way to identify brokers of any kind. Also, in that embodiment, advertiser auction algorithms and advertiser to publisher and audience data broker matching algorithms are standardized and transparent to all exchange participants. In an embodiment, no user identifiable information is sent to advertisers 206 until the user performs an action. Exchange 212 passes advertiser broker 208 only the attribute values. Advertisers 206 do not see the user identifier. At click-time, however, it is still possible for an advertiser to establish a user identifier and associate the bidding profile with that user. By participating in architecture 200, audience data broker 210 is explicitly sharing its information with advertiser broker 208. Although some leakage is inevitable whenever targeting is permitted (e.g., if a user is targeted and clicks on an ad, the advertiser can correlate and store the targeting attributes for that user), providing audience data from every ask to advertiser broker 208 for bidding purposes exacerbates the problem. However, this can be addressed by centralizing the auction system at the exchange level by requiring that advertiser broker 208 specifies a value function that is evaluated for each ask on exchange 212. For example, exchange 212 could require a linear value function, and advertisers 206 would specify a base bid and a bid increment for each attribute value. Exchange 212 would control the instantiation of the audience data, thus not leaking any to advertiser broker 208.

In one example, Expedia as an advertiser has an ad for "cheap vacations in Bali." Expedia chooses the keyword "Bali vacations." Business intelligence suggests that the best way to target vacation ads is around users who have a history of purchasing vacations, users who recently have purchased books on vacations and users who perform searches related to travel. Expedia decides to license user information from Amazon, MSNSearch, and Orbitz. Expedia agrees to pay Amazon 1 cent for using their user information for each ad impression. Similarly, Expedia agrees to pay 1 cent to MSNSearch and 3 cents to Orbitz.

For the "cheap Bali vacations" ad, Expedia creates a targeting profile for users who: "bought a book on Bali in the last month," "Have traveled to a tropical location in the last two years," "Have household income between $30,000 and $60,000," "Have been searching for vacation deals," and "Have ever clicked on ads." Expedia places a 20 cent base bid. To express their bidding preference, they also place a 5 cent incremental bid for the first attribute, a 10 cent incremental bid for the second attribute, a 2 cent incremental bid for the third attribute, 1 cent incremental bid for the fourth attribute, and a 2 cent incremental bid for the fifth attribute to express their bidding preference. Additionally, exchange 212 will log all views where user data was used to enrich targeting and help audience data broker 210 enforce the licensing fees. Borders as a publisher has a user requesting the page on the "Lonely Planet Guide to Indonesia" and they would like to show ads on that page. They call exchange 212 with the page URL and information about the user: "Bought four travel books in the last month," "Bought a book on Bali in the last month," and "Has clicked on ads before."

Given the URL, exchange 212 extracts keywords ("Bali vacations," "Indonesia travel," "exotic vacations," "beach vacations"), categories ("travel," "vacations") and proxied user data information (coming from the licenses with audience data broker 210), and sends this information to each advertiser broker. Each advertiser runs an auction for the impression. The advertiser broker can choose to ask for aggregate bids from advertisers and subtract the audience data broker licensing fees at the time of the impression. For example, Expedia might place an aggregate bid of 24 cents, and after subtracting the licensing fees, their base bid would be equal to 20 cents. Expedia's advertiser broker needs first to subtract all incremental bids and to assign credit to the publisher or audience data broker as appropriate. For example, Expedia's 5 cent incremental bid for "bought a book on Bali in the last month" and their 2 cent incremental bid for "Have ever clicked on ads" will be assigned to the publisher. The value for "Have traveled to a tropical location in the last two years" attribute is provided by Orbitz so the 10 cent incremental bit would be assigned to them. Neither the publisher, nor the audience data brokers were able to assess the household income of the user so this incremental bid is not used. The 1 cent incremental bid for the search user patterns will be credited to MSNSearch. After the appropriate credit distribution the advertiser broker would assign a publisher value bid (the base bid+any incremental publisher bids) to each advertiser. In case of Expedia publisher value bid would be equal to 27 cents. Given that Expedia's bid is CPC based, the advertiser broker needs to convert it to a CPI one before running an auction and selecting the best ads to send to the exchange. Expedia's advertiser broker knows that this specific ad is likely to get a 10% CTR, and thus for ranking purposes, Expedia is assigned a 2.7 cent CPI bid. If Expedia wins within its advertiser broker, its ad will be sent for global ranking to the exchange. If Expedia wins the global auction then their advertiser broker is charged 2.7 cents for displaying the Expedia ad. Expedia's ad gets served on Border's page. The user clicks on the ad. The user buys a two-week vacation to Bali.

As described above, in non-limiting embodiments, the invention includes a system to facilitate trading of advertising by having a publisher broker to represent publisher(s) that determines an ask for an advertisement space on the publisher (s)' webpages. An advertiser broker also represents advertiser (s) and manages an advertiser(s)' bid for the advertisement space. The exchange of the invention then facilitates transactions for advertisement space between the publisher broker and the advertiser broker.

Figure 3A:
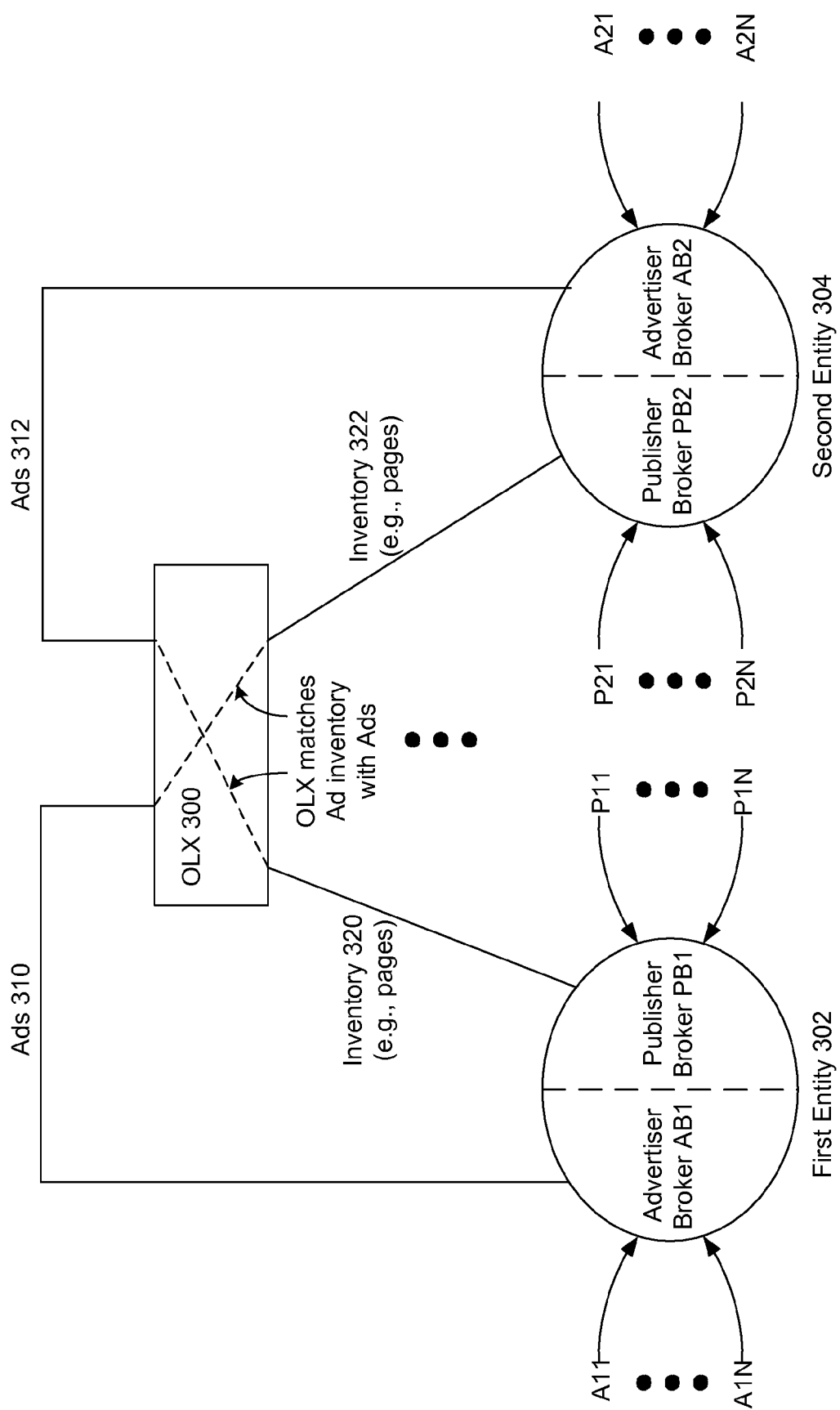
FIGS. 3A and 3B are exemplary non-limiting block diagrams of embodiments of an online advertising exchange in accordance with the invention.

The invention thus can operate in a system that enables broad liquidity over distributed advertising markets, such as the above-described advertising exchange systems. FIG. 3A illustrates a conceptual block diagram of an on-line advertising exchange 300 provided in accordance with the invention. As shown, a first entity 302 and a second entity 304 are subscribers to the services of exchange 300. First entity 302 may have an advertiser broker AB1 for brokering advertisements 310 from a variety of sources A11 thru A1N and a publisher broker PB1 for brokering inventory 320 from a variety of publishers P11 thru P1N. A goal of ad broker AB1 is to find inventory for existing advertisements. A goal of publisher broker PB1 is to represent publishers, i.e., to help obtain revenue for their inventory (e.g., pages). Similarly, second entity 304 may have an advertiser broker AB2 for brokering advertisements 312 from a variety of sources A21 thru A2N and a publisher broker PB2 for brokering inventory 322 from a variety of publishers P21 thru P2N.

In accordance with the invention, by providing ads 310 and 312 to OLX 300 according to a first communications layer, and by providing inventory 320 and 322 to OLX 300 according to an independent communications layer, OLX 300 can efficiently match advertisements to available inventory with greater simultaneous knowledge of multiple advertising networks.

Figure 3B:
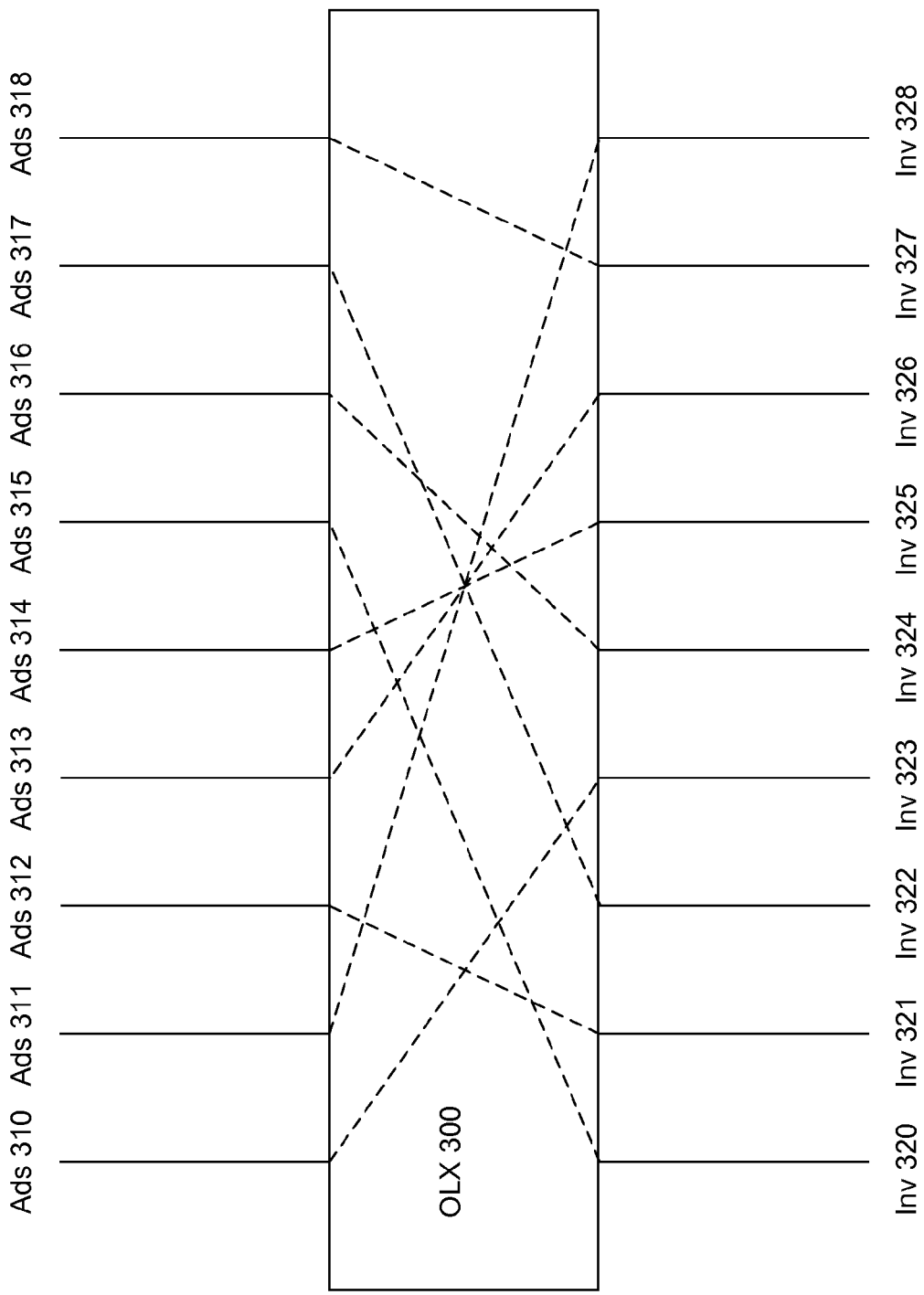

For instance, first entity 302 might be Microsoft's MSN Web site, and second entity 304 might be Yahoo's portal Web site. For simplicity, FIG. 3A illustrates only two entities, but advantageously, the invention can also be scaled to accommodate any number of advertising networks, e.g., eBay, Amazon, Google, etc. This is illustrated in FIG. 3B showing an OLX 300 that accommodates a wide range of advertising 310, 311, 312, 313, 314, 315, 316, 317, 318, etc. from a wide range of parties, and also accommodates a wide range of inventory 320, 321, 322, 323, 324, 325, 326, 327, 328, etc. from a wide range of parties. OLX 300 then makes the best assessment of how to match advertising content with inventory according to a variety of policies (e.g., maximizing ad revenue, maximizing quality of advertising, maximizing conversion rate, etc.). While various non-limiting embodiments of the invention are described in the context of two parties herein, this is for ease of conceptual presentation. It can be appreciated that the invention can be provided for any arbitrary number of advertising entities wishing to join the exchange 300.

As mentioned, the invention enables each participant to a multi-party advertising exchange to specify one or more utility functions that are invertible with respect to a common measure, such as revenue, e.g., expected revenue per standard advertising unit. The disparate utility functions of multiple participants can be normalized within the advertising exchange by converting the utility functions to the common measure enabling the comparison or translation of a first set of utility functions to a second set of utility functions in quantifiable terms.

Figure 4:
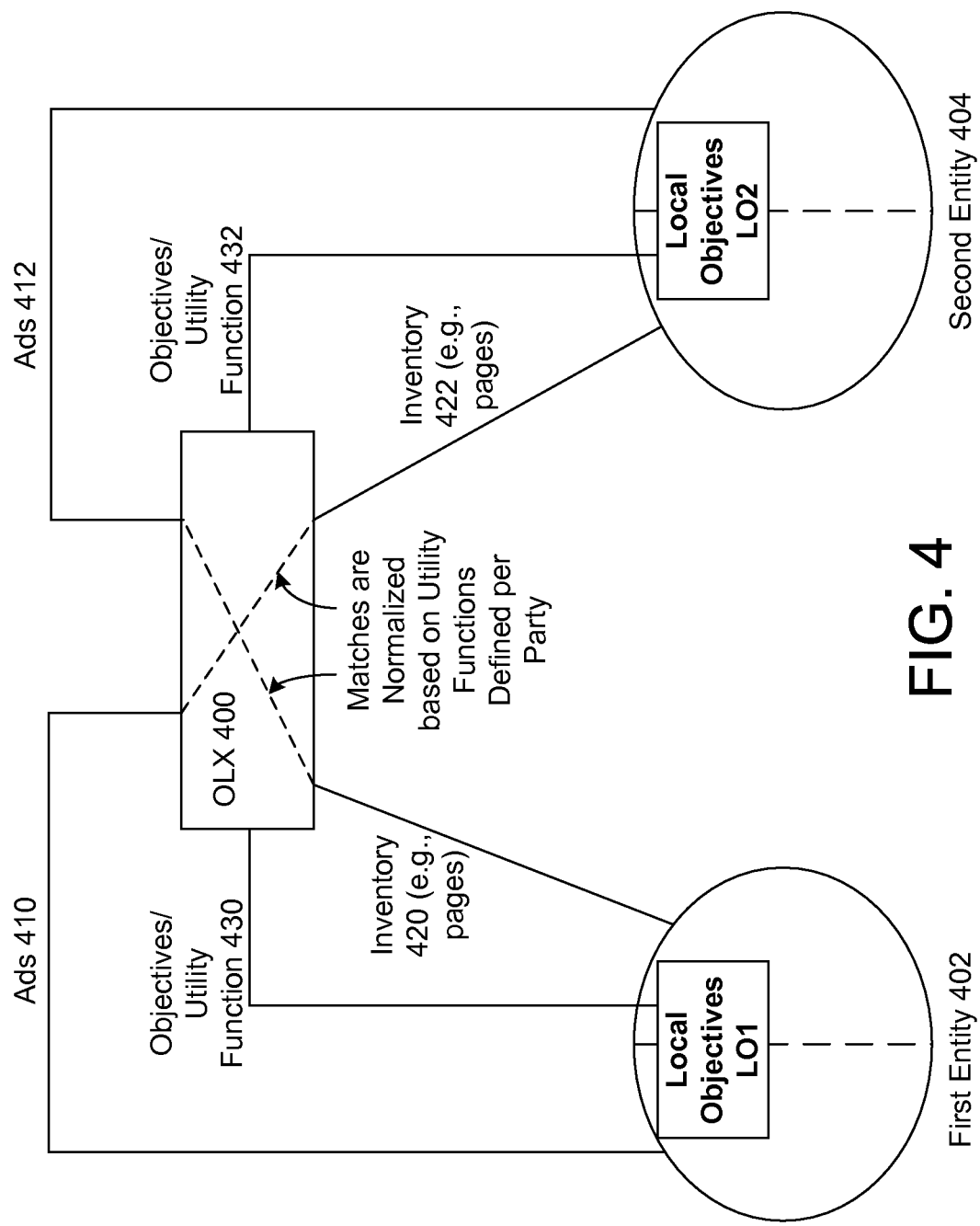
FIG. 4 is an exemplary block diagram illustrating an alternate embodiment of an online advertising exchange in accordance with the invention.

FIG. 4 illustrates an exemplary non-limiting embodiment of the invention that provides the ability to balance local party objectives with remote party objectives, in effect applying a tax under various circumstances as set by the parties. Each participant is provided with the ability to create and modify their objectives for input to the exchange 400. First entity 402 thus has a set of local objectives LO1 and second entity 404 has a set of local objectives LO2, which allow the entities 402 and 404 to fine tune their preferences with respect to participation in the exchange 400 of advertising 410, 412 and inventory 420, 422 in accordance with the invention. Receiving local objectives LO1 and local objectives LO2, exchange 400 automatically operates to "tax" certain transactions based on a comparison of objectives. This operates to balance the local objectives with the remote objectives so that all parties are satisfied with the quality of an advertising transaction based on pre-specified objectives or criteria, translating to a tax on the price of advertising in one direction or another, buyer or seller. The exchange 400 thus, in effect, provides a taxation method to balance local objectives with remote objectives.

For instance, a concrete example of the operation of such a taxation method would be if Yahoo, as first entity 402 with publisher space, says, "we don't want to publish ads that are of low conversion rate (a proxy for low quality)." By defining this objective in local objectives LO1, this information is taken into account by exchange 400 so that if an advertiser with ads having a low conversion rate purchases the inventory, a "bad quality" tax (e.g., 25%) is added to the purchase price to encourage, in a free market sense, more quality advertisers to purchase inventory, or inversely speaking, to discourage low quality advertisers from purchasing inventory without paying a premium on price. Conceptually, each party thus has "knobs" to fine tune the way its inventory or advertisements are handled by exchange 400, which in turn communicates an effective tax rate to the parties so that rational decisions can be made about the transaction.

Related to the notion of balancing local objectives is the notion that some transactions may create an instability, and in such circumstances, exchange 400, as an intermediary with knowledge of both buyer demand and seller supply, can operate to place roadblocks around certain transactional conditions to preserve overall stability of the market. For instance, where inventory, or supply, otherwise becomes limited, exchange 400 might operate to prevent bulk transaction purchasing to prevent overbuying where there is no supply. More generally, where a condition exists that may cause collapse of an advertising market, exchange 400 can operate to intervene to prevent further instability or collapse. In this respect, the local objectives definable by each participant can also impact whether roadblocks are applied for any given transaction under any particular set of circumstances.

In exemplary, non-limiting embodiments, the distributed framework for online advertising of the invention enables the specification of personal or private utility functions, i.e., each party can specify respective maximization functions based on different utility functions. Since each party has unique business goals and objectives, a wide variety of objectives may be toggled, or modified in accordance with the invention to specify party utility functions on a per party basis. For instance, as publisher broker, a typical goal is to maximize revenue for the available advertising inventory. But for another publisher broker connected to the exchange, the publisher broker might have 10 ads, but wish to emphasize only 1 particular ad for relevance. Yet another publisher broker might wish to only display "name brand" advertisements, i.e., no advertisements from relatively unknown "mom+pop" establishments, or other small concerns, and so on.

Once each party has specified a complete utility function which maps to the goals and objectives of the party with respect to advertising, this information is received by the exchange. Since initially, different parties' utility functions may be specified according to different vocabularies, the exchange operates to normalize all of the utility functions of the different parties into a common currency. For instance, with respect to advertising, utility functions have typically been defined with respect to such metrics as cost per impression (CPI), cost per conversion (CPC) or cost per acquisition (CPA). Any party can specify a utility function based on any of these metrics, and based on known mappings between metrics, utility functions across different parties can be normalized. For instance, the CPC metric can be converted to the CPI metric, and vice versa, according to the following relation:

CPC=CPI*Clickthroughs

And the CPA metric can be converted to the CPC metric, and vice versa, according to the following relation:

CPA=CPC*Probability of Action

And by substitution, the CPA metric can be converted to the CPI metric, and vice versa, according to the following relation:

CPA=CPI*Clickthroughs*Probability of Action

Figure 5:
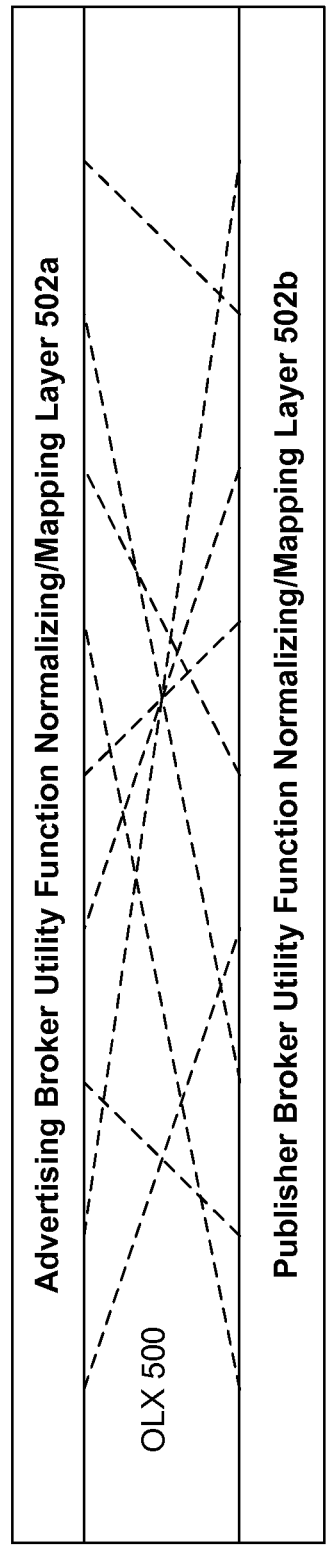
FIG. 5 illustrates another exemplary block diagram illustrating an alternate embodiment of an online advertising exchange in accordance with the invention.

Arbitrary metrics, i.e., based on arbitrary variables other than impressions, conversions or acquisitions, can also be defined, and mapped to a common currency by the exchange. This is illustrated conceptually by exchange 500 depicted in FIG. 5. As shown, for utility functions defined for advertising brokers, a mapping/normalizing layer is shown as a first layer 502a before matching content takes place in order to normalize private utility functions defined across parties. In addition, another layer 502b normalizes utility functions defined by publisher brokers. Once normalization occurs in layers 502a and 502b to compensate for the individual preferences of the participants, exchange 500 operates as described elsewhere herein to match supply of advertising inventory to demand by advertisers for the inventory based on a common advertising currency. In one embodiment, the normalization process is made blind to the identity of the parties' involved in order to ensure a fair and objective normalization of utility functions.

In addition, in order to specify personal utility functions, the invention provides tools that allow entities participating in the exchange to explicitly state their personal utility function. For instance, a florist may sell roses, which have high margins, and carnations, which have low margins. When determining which kinds of keywords to buy, normally, the florist might be interested in 3 different keywords including "flower," which might be inexpensive due to its widespread applicability, "rose," which might be expensive due to its high margin target, and "carnation," which might less expensive because of lower margins. Accordingly, based on anticipated returns, a party might specify a utility function that would select only high margin keywords, e.g., "rose", as a keyword. For another example, a participant might specify a utility function as a probability of expected clickthrough rate with respect to keywords, in which case a different set of keywords might be optimal.

In this regard, the number of factors that a user can vary with the tools of the present invention to personalize a utility function for advertising are virtually limitless. Also, the factors can be tailored to advertising segments, i.e., banner ads can have different factors for personalization than keywords, which have different facts for personalization than pop-up ads, and so on. Furthermore, rather than require an explicit mathematically defined utility function, the tools of the invention optionally utility function factors in terms of business goals, e.g., maximizing revenue, preserving brand name, broadest advertising exposure, most socially responsible advertising exposure, most demographically targeted advertising exposure, policies based on clickthrough/impression/conversion/acquisition probabilities, and the like.

According to a further aspect of the invention, a broad class of secondary markets can be made such as speculator contracts, which can be supported for various advertising markets enabled by the liquidity of the exchange normalization processes for disparate brokers in accordance with the invention. Speculation is typically thought of with respect to the buying, holding, and selling of stocks, bonds, commodities, currencies, collectibles, real estate, derivatives or any valuable financial instrument to profit from fluctuations in its price as opposed to buying it for use or for income via methods such as dividends or interest. The service provided by speculators to a market is primarily that by risking their own capital in the hope of profit, they add liquidity to the market and make it easier for others to offset risk, including those who may be classified as hedgers and arbitrageurs. In this regard, the exchange of the invention, by making advertising resources and products liquid across multiple advertising networks, applies to create a speculation market surrounding the success or failure of advertisements in general, or specific advertisements in particular. The price can be set based on one or more historical, or statistical properties associated with the class of advertising goods associated with the speculation contract. In this respect, speculation contracts can be considered to be similar to futures/options contracts. In one embodiment, the statistics used are median based statistics, which tend to be resistant to tampering, or other artificial influences over a particular market.

The challenge for the speculator with respect to the exchange of the invention is that the speculator can never take delivery of a successful advertisement. More specifically, the speculator does not buy advertising, per se, but rather a bet on the success or failure of the advertising. In this sense, the speculator makes bet on the outcome of advertising. This is akin to betting on the outcome of a movie on opening weekend based on an advertising strategy prior to any audience viewing the movie. If the movie does well, then the advertising has worked effectively. If the movie dies an obscure death, then the advertising did not work effectively.

Having thus described an exemplary advertising exchange environment, various embodiments of the systems and methods for third party participation in online advertising transactions in accordance with the invention are presented in more detail below.

Arbitrage Broker for Online Advertising Exchange

The above exemplary operating environment is described generally in terms of auction based on a common currency provided by the exchange. However, for other scenarios where a publisher sets an ask price (however specified) higher than any potential advertiser's bid based on the existing information held by each party, then, traditionally, an advertising transaction will not occur because of the bid-ask gap.

Figure 6:
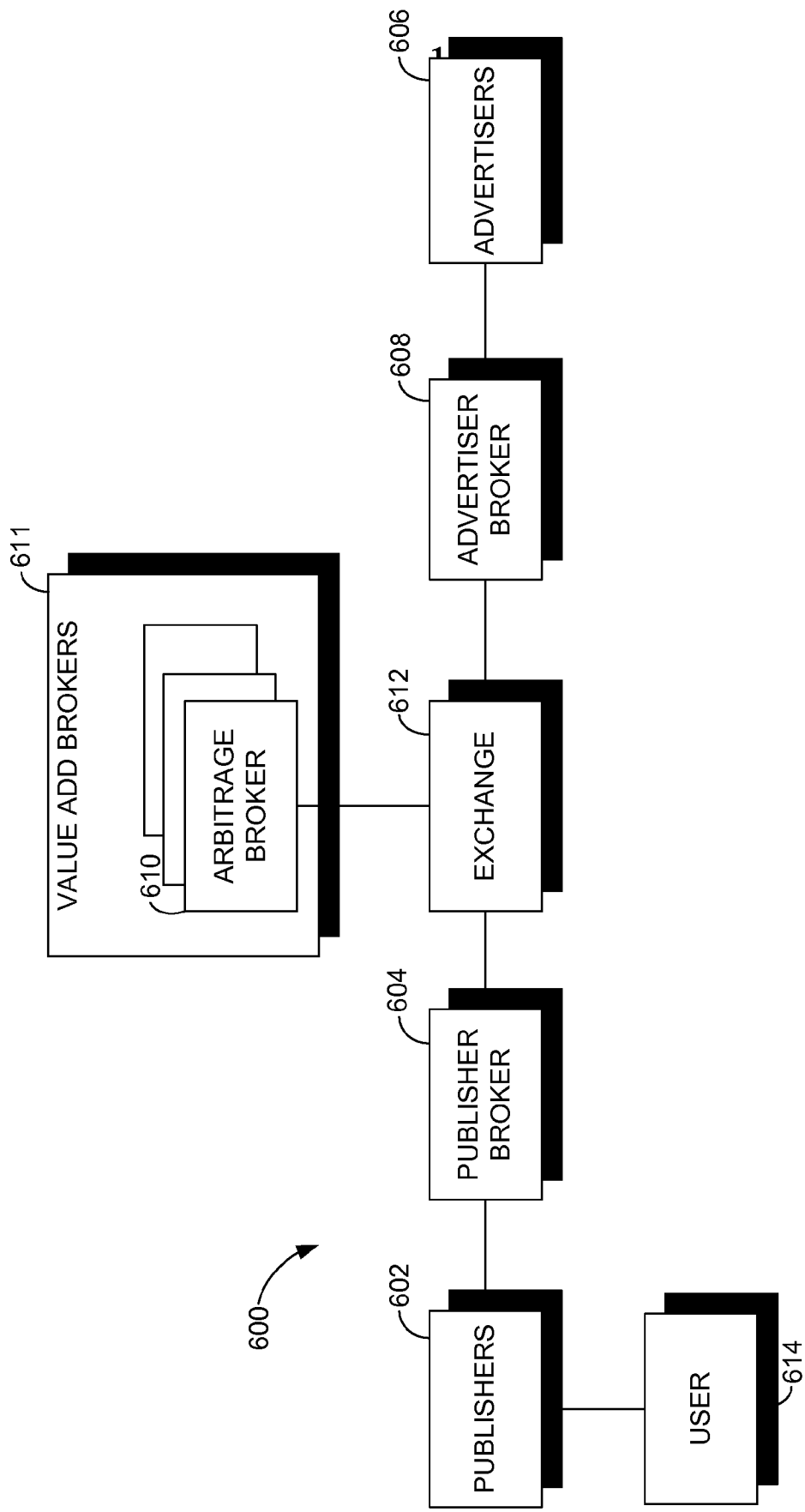
FIG. 6 illustrates a distributed architecture for online advertising, further illustrating an embodiment of the present invention.

FIG. 6 illustrates an exemplary embodiment of a system for third party participation in arbitrage opportunities in online advertising transactions. Referring back to FIG. 2 and the discussion thereof, the components of FIG. 6 operate in a similar fashion, except where identified below.

According to one aspect, the invention provides an arbitrage broker 610 that plugs into a federated online advertising exchange 612. Typically, when a CPA or other metric is used as a common currency in the exchange 612, the CPC depends on a statistic, which is normally determined as an expectation of an average (e.g., mean or median) only. For example, a CPC is related to CPI multiplied by clickthrough probability (e.g., mean or median of click rate). It follows that there is a measure of variance or confidence in such a statistic dependent on the quality of the data used to calculate the statistic. As a result, an opportunity exists to provide further data to increase the confidence in the statistic and thereby obtain a higher measure of confidence in a statistic.

For example a publisher 602 might have a high variant statistic that an impression is going to convert at a given rate, which high variance may be due to a publisher that cannot make an highly granular estimate or measure (e.g., the publisher only knows how to make a granular measure over the keyword "flowers" as opposed to "flowers" paired with a particular merchant). Or perhaps a publisher 602 only measures the statistic based on keyword statistics instead of keyword per advertiser. As is understood for a publisher-advertiser pair for a pending transaction, even assuming the same CPI, if the publisher 602 and advertiser 606 make use of different statistics in calculating the CPC for the respective bid and ask price for the advertising event, there is the likelihood that the pair will not agree on price to consummate the transaction.

According to various non-limiting embodiments, the arbitrage broker 610 can use internal online exchange data or statistical insights provided by the exchange 612 or derived from internal online exchange data in order to gain insight into the success of a pending online advertising transaction.

According to one aspect, the invention provides an ability to appraise a pending online advertising transaction event on the exchange 612, and provides an opportunity to a third party (e.g. the arbitrage broker 610) to determine whether a better statistic with a tighter variance is available for the transaction, whereby the transaction should rationally occur. In this instance, an arbitrage broker 610 can buy the apparently undervalued inventory by taking advantage of insight as such acquired statistical insight, recognized trends, or other available or created insights, and then reap the reward of a successful transaction (e.g., a conversion).

According to a further embodiment, the arbitrage broker 610 is able to profit from facilitating online advertising transactions by bearing risk of the advertising transactions. As described above, the invention provides the ability for a third party (e.g. the arbitrage broker 610) to make better use of online advertising statistics and data, to assume the risk by financing the transaction, and participate in the potential rewards of a successful transaction (e.g., a conversion).

Although such arbitrage broker data or insights may be obtained from the online advertising exchange, according to a further non-limiting embodiment, the data or insights may come from sources external to the online advertising exchange (shown in FIG. 7 below). For instance, an arbitrage broker 610 may have some knowledge of online advertising exchange participants (e.g. publishers 602, advertisers 606) in a pending transaction or the audience (e.g., users 614) in the corresponding event of the pending transaction. For example, an arbitrage broker 610 that knows or believes in a sense (e.g., based on historical purchasing data, intuition, pattern matching, or other source external to the exchange) that a particular event will convert at a higher rate than supposed by an advertiser 606 would lead the arbitrager 610 to see a higher value to a completed transaction than the advertiser 606. As a further example, if an arbitrage broker 610 can recognize a particular user 614 or pattern of user behavior that either the advertiser 606 or publisher 602 do not recognize, and which enforces a belief that the underlying user 614 is a consistent click-through purchaser (e.g., user is female age 24-30 on a shoe site, or user is male sports fan age 18-24 on a baseball site during baseball season), then the arbitrage broker 610 could value this transaction higher than either the publisher 602 or advertiser 606.

As a further example, assume cost per transaction between advertiser 606 and publisher 602 is estimated by the advertiser 606 as follows. For a particular impression, there is only 1/1000 chance for conversion with payout of $1000. Thus the advertiser's rational willingness to pay is $1/impression, but $1000 for a conversion for example. However, the publisher 602 may believe that in the publisher's particular industry with other advertisers 606, the conversion is ten times that rate. As a result publisher 602 values impressions at $10/impression and $1000/conversion. Consequently, this advertiser 606 and publisher 602 will not transact because of the disconnect in pricing on per impression basis. When the arbitrage broker 610 perceives that, for the particular event, the user 614 is highly pre-qualified, the arbitrage broker 610 will offer to take the risk, pay the $10/impression to the publisher 602, and be paid on a per conversion basis from the advertiser 606. As a result, the arbitrage broker 610 takes the risk on the $10/impression and will take the $1000 on a successful conversion. The arbitrage broker 610 buys the impression and makes use of it for this add, and the advertiser 606 pays $1000 once the ad converts. The reason that the arbitrage broker 610 takes the risk is because of the perception that there is a better than 10% chance that the add will convert from an impression to the user 614 to a sale or other contemplated action.

Although this example is expressed as an all or nothing proposition (e.g., the arbitrage broker takes all the risk paying $10 and takes all the reward, if any), there are limitless possibilities for agreements to share risk that could be made between the participants (e.g., advertiser 606 and arbitrage broker 610). For example, using the above circumstances, the advertiser 606 could be willing to share risk up to $5/impression for a commensurate payout to the arbitrage broker 610 for making up the additional cost per impression. The risk sharing arrangement is only limited by the willingness of the participants (e.g., advertiser 606 and arbitrage broker 610 in this example) to transact, without deviating from the scope of the present invention.

Advantageously, this risk-sharing arrangement is self-correcting with respect to potential fraud on the market. For example, because the arbitrage broker 610 is risking capital on the transaction (e.g., betting on the transaction's successful conversion), the arbitrage broker 610 has an incentive to ensure that decisions are made prudently and with the best available information, while minimizing costs associated with facilitating the transaction (e.g., costs of acquiring additional information to form the higher confidence statistic, costs of acquiring additional external market information, etc.). This also assures a higher quality of information available to the market because of the incentive or disincentive associated with the provision of correct or incorrect information respectively. As a further advantage, the presence of the arbitrage broker 610 in the online advertising exchange increases the total market information available for a particular transaction by providing the chance to participate in the potential rewards of a successful conversion. This in turns increases the liquidity of the advertising market in the online advertising exchange (e.g., by causing transactions to occur which otherwise may not occur), and leads to a more efficient advertising market.

A further advantage is that because the arbitrage broker 610 is risking capital, advertisers 606 have a reason to trust the information expertise brought to the exchange by the arbitrage broker 610 and thus enter risk sharing arrangements with the arbitrage broker 610 based on the reduced risk. A further advantage is that because of the way the utility functions are specified prior to providing events or ads to the online advertising exchange, the advertisers 606 maintain control over the ads exposure and publishers 602 maintain control over the types of ads appearing in their publishing inventory (e.g., the point of contention would be price based on the imperfect information about the pending transaction).

Figure 7:
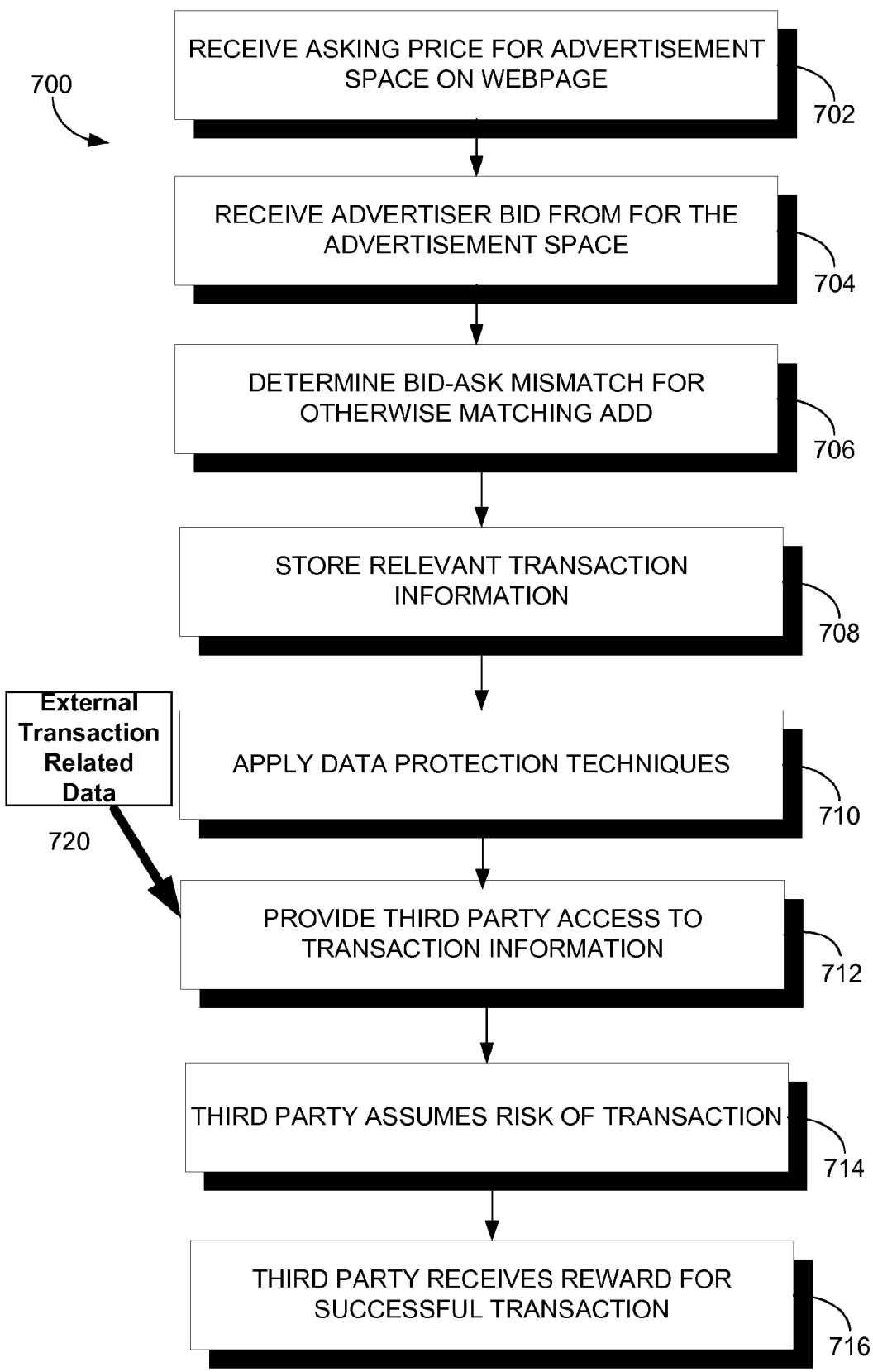
FIG. 7 is a block diagram of an exemplary non-limiting embodiment of a method for providing third party participation in arbitrage opportunities in online advertising transactions according to one aspect of the present invention.

FIG. 7 illustrates a block diagram of an exemplary non-limiting embodiment of the method 700 for third party participation in arbitrage opportunities in online advertising transactions. At 702 a publishing entity (e.g., via a publisher 602 or publishers representative 604) electronic communication is received representing an ad placement ask price and associated publisher transaction data and associated one or more publisher requirements. At 704, an advertising entity (e.g., via an advertiser 606 or advertisers representative 608) electronic communication is received representing an ad placement bid price and associated advertiser transaction data and associated one or more advertiser requirements. If it is determined at 706 that there is a substantial match of the one or more publisher requirements with the one or more advertiser requirements, and there exists a substantial mismatch of the ad placement bid price and the ad placement ask price (e.g., the bid-ask gap is substantial), traditionally a transaction would not occur. However, according to various non-limiting embodiments of the invention, at 708 information contained in the advertising and publishing entities electronic communications is stored and dynamic (e.g., substantially real-time) electronic access at 712 is provided to the stored information to a third-party (e.g. the arbitrage broker 610), so that the arbitrage broker 610 can assess the transaction and determine whether it is undervalued, or whether it wants to bet its capital on the risk that the advertising transaction would end in a profitable result (e.g., a conversion with payout higher than associated costs). As described in more detail below, various data protection techniques may be applied to the transaction data to meet goals and concerns of the online advertising exchange at 710. If the arbitrage broker 610 determines in the affirmative (e.g., based on internal data 712 or external sources 720) that the transaction is believed to be profitable, then the arbitrage broker 610 decides to consummate the advertising transaction between the publisher and advertiser (thereby assuming the risk at 714) by contributing at least a portion of the bid-ask gap. It the simplest case, the arbitrage broker 610 can pay for the entire impression event. However, the invention can accommodate any number of risk sharing agreements between and among exchange participants. If a successful transaction transpires (e.g., a conversion) then the arbitrage broker 610 can be rewarded at 716 (e.g., a portion of the amount received or payable for a conversion).

For example, a typical transaction according to one embodiment of invention, can begin with a query coming in to the exchange 612 from a geographical location that is associated with a particular type of internet traffic (e.g. online gambling, a sports team, golf venue, particular news event). Other information can also be supplied to the exchange 612 by the publisher 602 or its representative 604 (e.g., the originating page the exchange user ID, site local time, the user agent, the headers and metadata, and other information known about the page request). According to a further embodiment, various bits of information can be sent to various online exchange value add brokers 611 (e.g., the exchange user id can be sent to the audience data brokers to determine if additional user information is available to increase a pending transactions value). According to the type of traffic, the impression can be more valuable if it is from a male (e.g., for instance, if males are more prone to participating in online gambling or having an affinity for golf and purchasing golf equipment, services, and golfing related vacations) rather than from a female. Furthermore, according to the particular local time for which the impression is about to occur, the impression may be more valuable if the transaction is occurring after normal working hours (e.g., online gambling from the users location more likely by males after 5 pm). The world, revolving as it does, unless the advertiser and or publisher know the geographical location of the pending user impression, parties to a pending advertising transaction may not know if it is day or night at the location of the pending impression event. As a result, this geographical location of the pending user impression event makes a substantial difference in economic value of the pending impression event. Likewise for the attribute of whether the user is male or female.

Thus, if it can be determined that, at the location of pending impression, it is after normal working hours and that the user is a male, then a party to the transaction (e.g., advertiser 602 or publisher 606) will value the pending impression higher than without the information. The same can be said for a third party able to view such a pending transaction either in native form or with any number of transaction details abstracted as described below. As a result, the online advertising marketplace could make better economic use of the two bits of information: 1) is the pending impression event in a geographical location where it is after normal working hours and 2) is the user a male. For this example transaction, the publisher 602 in this case may be able to determine the geographical location of the user impression (e.g. from IP address to geo-location matching techniques), but such information may not be available to a potential advertiser 606. All else being equal, the publisher 602 may value the transaction more highly than the advertiser 606 and, as a result, the pending transaction does not occur due to a pricing disagreement.

In order to make economic use of this inequality of information (and resultant impression event value mismatch) by a third party (e.g. the arbitrage broker 610) to the online advertising transaction by determining the missing bits, the online advertising exchange 612 has to expose the information that absent that the missing bits of information (e.g., unqualified by those dimensions), the transaction is worth a certain amount (e.g. a dollar), but with those added dimensions, it is worth another amount (e.g., two dollars). Otherwise a third party (e.g., arbitrage broker 610, audience data broker 210, etc.) would not know how to value the potential bits of information that can be offered or acted upon to properly value the transaction. At this point, the online advertising exchange 612, by exposing the balance of abstracted and native form data applicable to the transaction as described below, enables the arbitrage broker 610 to perform an analysis and determine missing attributes or whether it more highly values a consummated transaction (e.g., through statistical analysis, pattern matching, attribute correlations, etc.). As a result, the arbitrage broker 610 can then determine its risk-reward structure for participating in the transaction.

Despite the advantages of introducing the third party participant (e.g., arbitrage broker 610) into the pending transaction of the online advertising exchange 612, there can be several problems with exposing the exchange data to third party participants. For example, user 614 (e.g. audience) privacy must be maintained in order to prevent fears (either rational or irrational) of a Big-Brother-like system keeping track of user internet usage habits, for which it may feared that such data could be exploited or used for nefarious purpose (e.g., government monitoring, sending spam email, stalking, etc.).

Another concern that must be addressed is maintenance of exchange participants' privacy. For example, Amazon.com® (acting as an advertiser 606) would not want Borders Books® to know which keywords it was purchasing, what sites it chose to patronize (e.g., publishers 606), and what price it is paying for what level of traffic. Such proprietary business information is closely guarded and should be treated with the same or higher regard by an online advertising exchange 612 exposing any representation of the data to an online advertising exchange participant, including third parties such as the arbitrage broker 610. Such fears can prevent adoption and/or hinder proliferation of the online exchange 612.

Another concern is the potential loss of value to the exchange 612 or exchange participants (publishers 602, publisher brokers 604, advertisers 606, advertiser brokers 608, and value add brokers 611) that could occur if large amounts of information are allowed to leak out of the system. For example, an audience data broker 210 can spend significant amounts of time and capital to compile user data with the expectation of some measure of return for the trouble and expense. If the audience data broker's data is allowed to leak out of the system and then either become freely available or available at reduced cost, this can undercut the audience data broker's expected return on investment. Anticipating such a risk, a potential broker may choose not to participate in the exchange 612.

Figure 8:
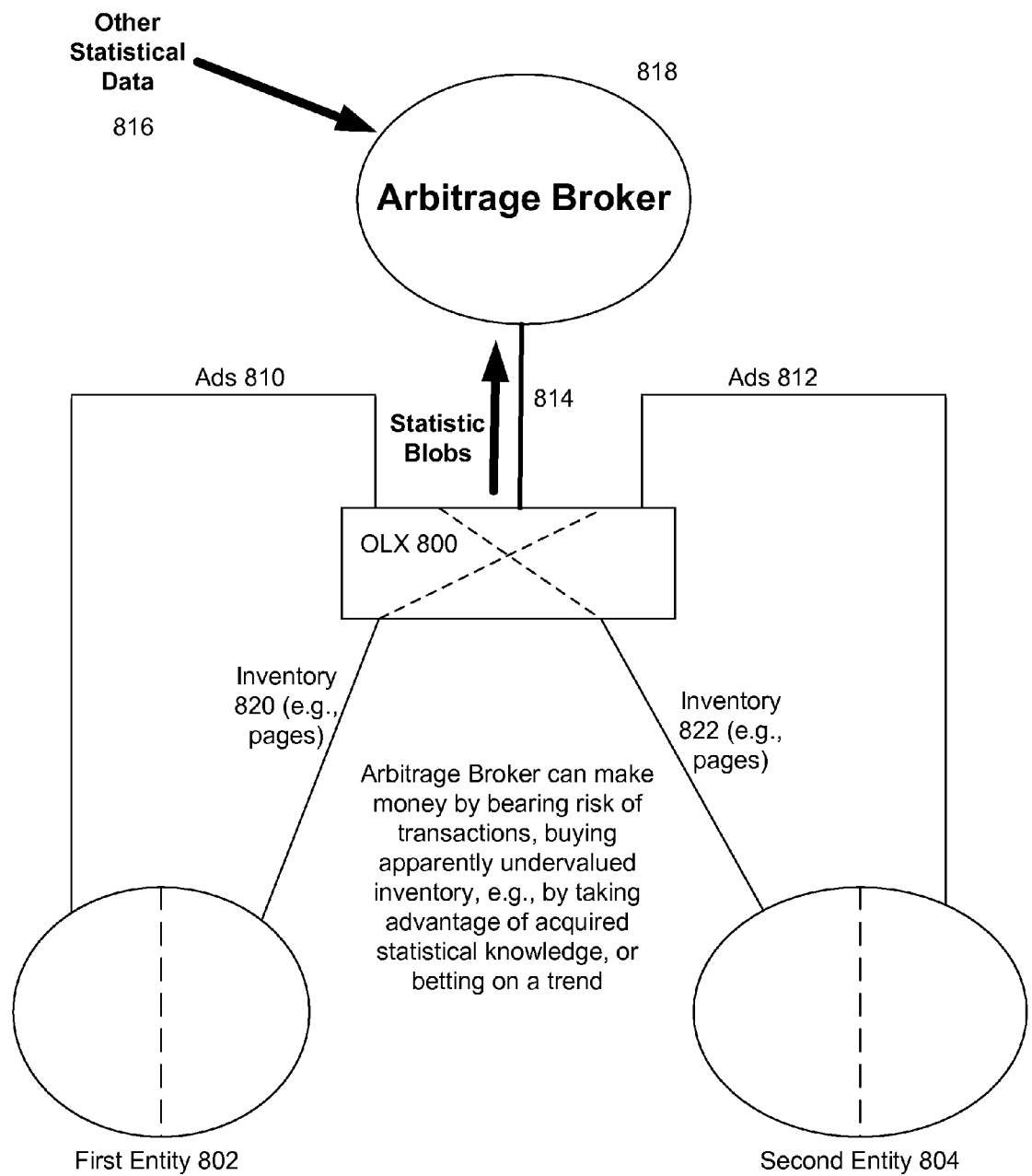
FIG. 8 illustrates an exemplary non-limiting embodiment of a system for providing third party participation in arbitrage opportunities in online advertising transactions according to one aspect of the present invention.

Referring now to FIG. 8, there is illustrated an exemplary non-limiting embodiment of a system for providing third party participation in online advertising transactions according to one aspect of the present invention. According to a further non-limiting embodiment, the invention provides techniques for creating statistical blobs 814 of market transaction data through the use of data abstraction techniques in order to preserve the privacy of online advertising exchange participants, preserve the integrity and proprietary nature of the online exchange data, and ensure the privacy of the end-user ad viewer while providing access to arbitrage opportunities (as described above). According to one aspect of the invention, a plurality of demographic or other transaction data can be abstracted (e.g., via a one way hash which preserves hierarchical distance so that the data can be analyzed) and provided to an online advertising exchange third party participant (e.g., the arbitrage broker 818) without revealing critical privacy information to the arbitrage broker 818. According to one aspect, information available to the third party arbitrage broker 818 is a completely hashed space, which is essentially useless outside the online advertising exchange as will be described in more detail below.

For example, the online advertising exchange 800 can expose to a set of arbitrage brokers 818 what appear to be random bits about the transaction that are, in fact, cryptographically hashed or otherwise abstracted using similar techniques, but still have the same relationship to the underlying data transaction described above. As a result, the native data space of what the data means can be completely private to the exchange 800.

According to one aspect, the invention provides infrastructure for connecting a specialized information broker or value add broker (e.g. the arbitrage broker 818) to an online advertising exchange 800. Any number of arbitrage brokers 818 can plug into the online advertising exchange 800 that can look for arbitrage opportunities in the on-line advertising market existing in the exchange 800. As described above, the arbitrage broker 818 can make money by bearing risk of transactions (e.g., buying apparently undervalued inventory, taking advantage of acquired statistical insight, or betting on a trend).

While it is important to provide the third party participant (e.g. the arbitrage broker 800) with the ability to analyze the details of pending transactions, as described above, it also important to conceal at least some of the online advertising exchange transaction details. Analysis of transaction details available in a native data bit space is relatively straightforward. However, with a taxonomy used to categorize transaction details in native data bit space with a plurality of singular details concealed (e.g. via a one way hash), the ability to determine correlations and bit patterns on a hashed data space requires that a taxonomical distance of the attribute nodes be preserved. For example, FIG. 9 illustrates an exemplary non-limiting embodiment of a transformation on transaction data according to one aspect of the present invention.

Another important concern in providing third party participation in an online advertising transaction is speed of execution while persisting the dimensionality of the transaction details taxonomy. For example, if each individual transaction attribute is available in hashed form (e.g. for an array of IP addresses, making available individual hashed IP addresses), or even if there is some reduction in the dimensionality of the data space, the entire space becomes an extremely large lookup table. As a result the ability to search for correlations in the transaction data is limited by the ability to build and search extremely large lookup tables. According to various non-limiting embodiments, the invention provides a similarity function (e.g., a numbering or bit encoding scheme for attributes) such that the relationships between the numbers or bit patterns are representative of the relationships between transaction attributes. As a result, the online advertising exchange provides access to a taxonomy of encoded attributes in the hashed space, where the relationships between the nodes are substantially maintained relative to the native data space representation of the attributes.

Figure 9:
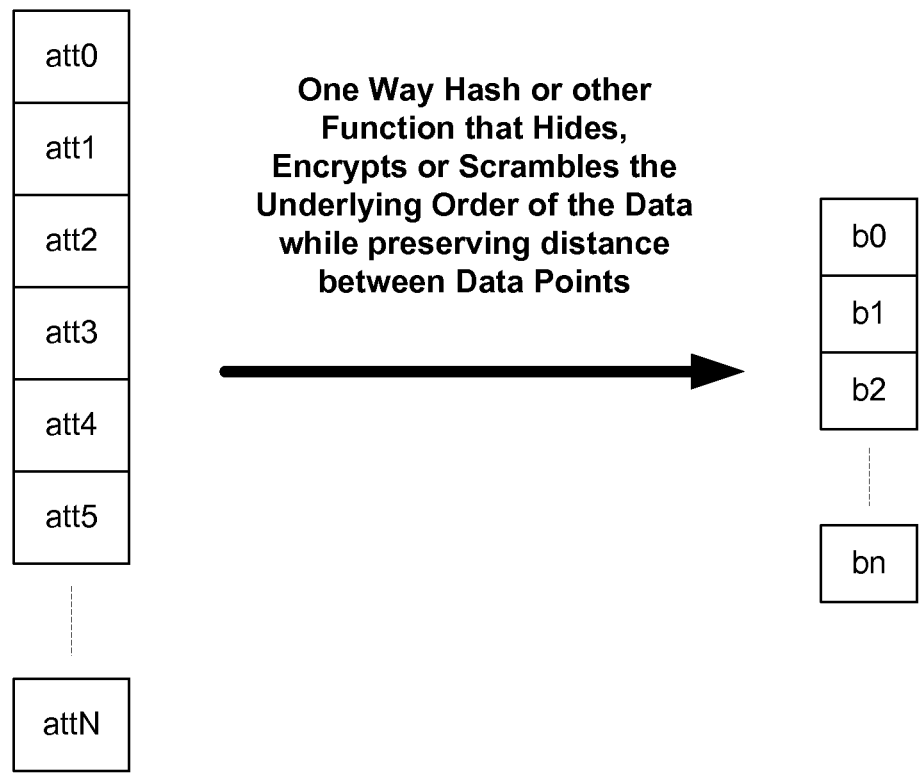
FIG. 9 illustrates an exemplary non-limiting embodiment of a transformation on transaction data that could be employed according to one aspect of the present invention.

In order to address concerns described above, according to various non-limiting embodiments of the invention, the representation that the exchange 800 uses internally to normalize attributes is hashed to another representation (e.g., as depicted in FIG. 9) so that the data is a generic statistical blob 814 representing a class of people or transactions, rather than a particular person or transaction. As an oversimplification, suppose a third party (e.g. the arbitrage broker 818) can determine with confidence that, for a pending transaction, a particular attribute 47 is applicable to the transaction (e.g., based on pattern matching, statistical inference, or externally acquired data 816). As a result, the arbitrage broker can then determine that, based on the knowledge that attribute 47 is close to the high converting attributes 46 and 48, then this particular pending transaction is a potentially undervalued transaction (e.g., an arbitrage candidate). As a further example, in a native space taxonomy tennis would be closer in the category of racquet sports to racquetball and squash than to badminton or ping pong. Such distance relationships can be preserved in a hashed space according to one aspect of the invention.

In order to preserve such distance relationships, according to various non-limiting embodiments, the invention provides an n-ary tree for preserving structure of the hashed attribute space to enable online transaction data analysis (e.g. statistical inference building, pattern matching, etc.), without loss of generalization.

Figure 10:
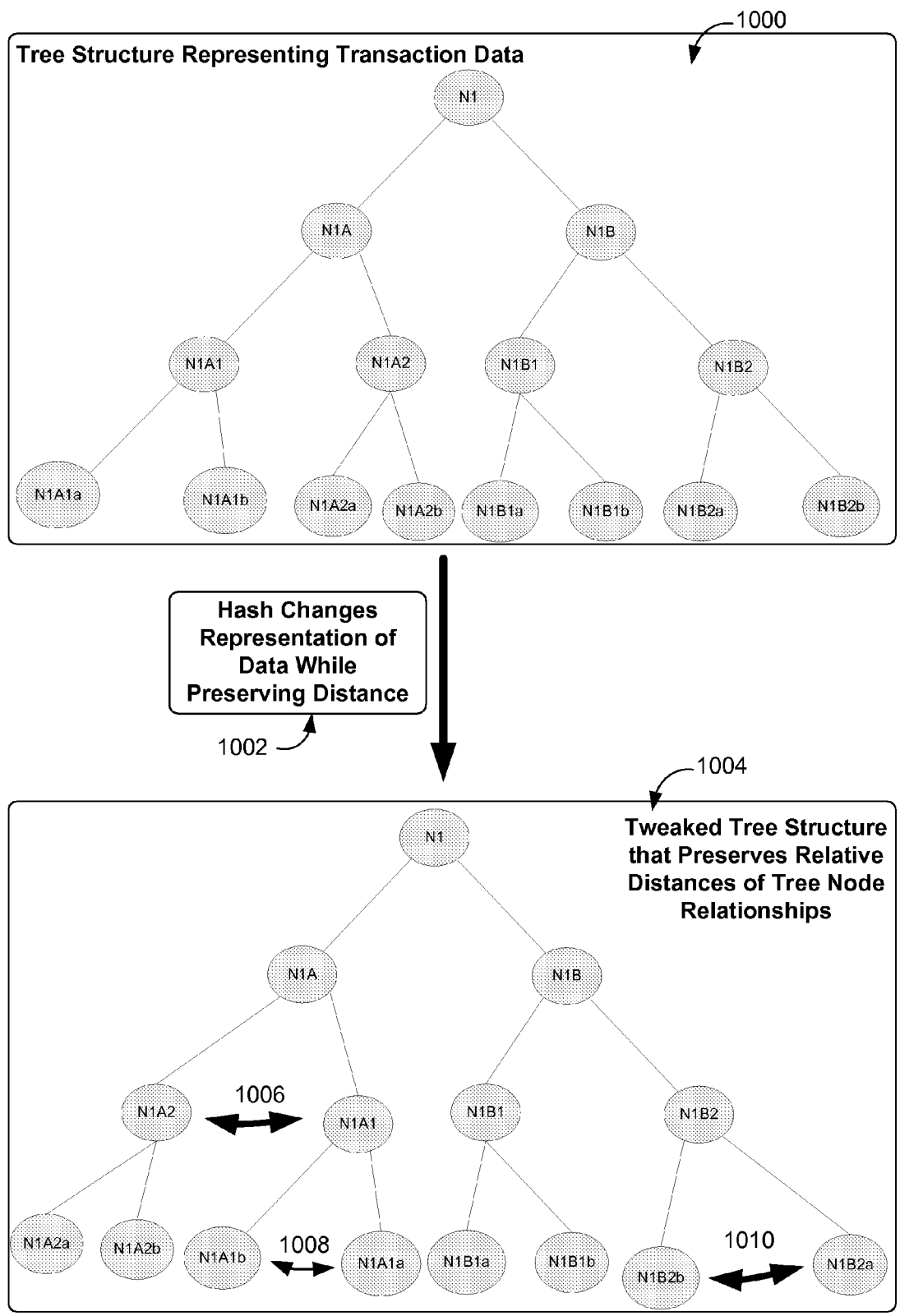
FIG. 10 illustrates an exemplary non-limiting embodiment of a transformation on transaction data according to one aspect of the present invention.

For example, FIG. 10 illustrates an exemplary non-limiting embodiment of a transformation on a body of native data space transaction data where the relationships between the nodes in the hashed space are substantially maintained relative to the native data space representation, according to one aspect of the present invention. Data represented in FIG. 10 at 1000 can be transformed by the example hash or transformation on transaction data at 1002 that, in a sense, scrambles the data to the form at 1004. As a result, the arbitrage broker 818 does not know the specific native space details of the transaction according to the protections applied by exchange 800 (to address concerns above) but can, advantageously, still analyze and use the data as classes of statistical blobs due to preservation of the order and the relative distance of nodes preserved within the tree structure. This preservation of order and relative distance of nodes holds even though various child nodes are switched from left to right and right to left (at 1006, 1008, 1010).

For example, according to one embodiment the n-ary tree can be used as a taxonomy binding the branching factors on any level in the tree (e.g., two for binary tree). While any value of branching factor may be used, a binary tree is illustrated for simplicity. Furthermore, a one-to-one mapping can be created between general ordered trees and binary trees (e.g., n-ary) for the purposes of digital encoding, storage, and creating digital analysis tools. For the binary tree case, tracing a path down the tree, because the most significant digit is the top level node, and the least significant digit at the bottom nodes, the online advertising exchange can encode a conceptual space (e.g., where the distance in the digital number corresponds to topical distance in the tree, corresponds to path distance for a user). This result follows because if two nodes have a common prefix bit, then all of the nodes ancestors (e.g. above the node of interest) are identical to the common node. Below the common node, the bit of the common node, gives the lowest bounding ancestor that the child nodes share. As a result, according to one embodiment, the invention provides a rational n-ary (e.g. with the special case of n=2 being the binary tree described above) tree that segments the world of transaction details of interest, without loss of generality (e.g., persisting the dimensionality of the taxonomy), and while providing enhanced search speed.

Another important concern in providing third party participation in an online advertising transaction is hindering the ability to reverse engineer any encoded attribute space to reveal the underlying transaction details. Although various techniques exist to extract encrypted data (e.g., comparing a popularity of a certain bit or bit pattern being set that would correspond to a distribution of word frequency in the English language, or figuring out that a certain percentage of internet users are male corresponds to another bit pattern set), various techniques can be used to obfuscate the internal details of the encoded attribute space. Accordingly, one aspect the invention provides for obfuscating the taxonomy in addition to hashing the transaction attributes to hinder such reverse engineering attempts (e.g., by expansion, contraction, combination, aggregation, using subsets, etc. for nodes an encoded attribute space). For example, rather than encoding a user zip code or specific city, a larger region or county could be used. These examples are merely illustrative of the possible obfuscation options and are not intended to limit the claimed invention. It is clear that many possible options exist to provide a taxonomy that is fine enough allow online advertising transaction analysis but course enough that hinders reverse engineering attempts, while meeting the privacy goals determined by the online advertising exchange.

According to a further embodiment, the exchange can determine what balance of information is abstracted and available in it native form in order to increase the online advertising exchange performance to the various goals of the exchange (e.g., privacy, protection of proprietary business information, data availability to analysis, etc.). For example, the online exchange may specify that no personally identifying audience data is available across participants (e.g., user name, SSN, address, phone, etc. are absolutely not available and other identifying information such as sex, etc. are abstracted or available to a varying degree in native form), may specify that proprietary business information is abstracted to the extent that it is not available publicly (e.g., it may be publicly known that an advertiser appears on Google®, but aggregate values and other information is not public), and that other information (e.g., keywords, time of day at the geographical location of pending impression event, zip code, etc) may be available in varying degree in native form. This example is merely illustrative and not intended to limit the present invention. Rather it is intended to demonstrate the flexibility of the systems and methods in meeting the goals of the online advertising exchange in enabling third party participation in arbitrage opportunities in online advertising transactions.

According to a further embodiment, the exchange can accept limited user or exchange participant input to determine, in part, what balance of information is abstracted and available in its native form, on a consensual basis, with respect to the user or participant in order to accomplish the respective user or participant goals. For example, one publisher's user base may be more amenable to revealing certain user information to advertisers than a second publisher's user base. For example, a first publisher's user base may allow non-identifying user profile information to be revealed so that advertising revenues can subsidize the publisher's user subscription rates. Accordingly, resultant impression events from the first publisher can be more valuable to prospective advertisers due to the increased availability for ad targeting and higher confidence in clickthrough probability.

In another example, an advertiser may be willing to share benefits payable on successful conversion in order to entice publishers or users to reveal incrementally more valuable targeting information. Such benefit can be offered through the exchange as a reward to users or publishers (e.g., in the form of a rebate or discount on the underlying product or service or increased payment on successful conversion). Accordingly, in one embodiment, the exchange can determine what balance of market transaction and participant details will be available in its native form or abstracted according to the wishes of the participants or users. Such wishes can be in the form of a specified profile or other means, either short or long-term (e.g., what is generally available, versus what can be specified when a user is searching to change car insurance companies or currently searching for best prices on a prospective vehicle purchase). These examples are merely illustrative and not intended to limit the present invention. Rather the examples are intended to demonstrate the utility and flexibility of the systems and methods in meeting the goals of the online advertising exchange in protecting participant privacy in accordance with participant wishes while increasing the information provided for third party participation in arbitrage opportunities in online advertising transactions.

While various bits may be available in native form according to the goals of the online advertising exchange and participant or user preferences, according to one aspect, the invention advantageously protects sufficient market details while providing sufficient information in order to value transactions and calculate statistics on economic value of pending transactions. In a particular example, an arbitrage broker may never in fact be able to determine whether this is an advertiser of flowers, cars, or sports team paraphernalia, and matched to a pending impression for a soldier searching for flowers before mother's day, a new college graduate looking for a new car after grabbing the brass ring, or a male Seattle Mariners fan, age 18-24. In various non-limiting embodiments, the balance of abstracted and native data provided by the online advertising exchange provide third party participants (e.g., arbitrage broker) the opportunity to determine correlations of bit patterns that have proven (e.g., historically or based on some other available or created insight) to be reliable as successful matches of a particular bit pattern class of advertiser, to a particular bit pattern for a user or user class, for a particular page request, in a given time period.

Another important concern in providing third party participation in an online advertising transaction is the ability to update the taxonomy while preserving the value of the exchange to the third party participants (e.g. time and money invested in creating arbitrage broker intelligence). For example, suppose that at the initial setup of the online operating exchange, a taxonomy is created for the categorization, storage, transmission and analysis of online advertising transaction details. As time passes, it may become necessary to update the taxonomy due to a number of reasons (e.g. finer granularity desired, more details can be desired to be made available in native form, different user or participant classification or aggregation of characteristics is desired, etc.). Such updates can affect the bit patterns used by arbitrage brokers to create intelligent algorithms for quickly valuing pending transactions. According to a further aspect, the invention enables a conversion between various versions of the taxonomy and resulting bit patterns to preserve exchange value to third party participants.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

There are multiple ways of implementing the present invention, e.g., an appropriate API, tool kit, driver code, operating system, control, standalone or downloadable software object, etc. which enables applications and services to use the advertising techniques of the invention. The invention contemplates the use of the invention from the standpoint of an API (or other software object), as well as from a software or hardware object that operates according to the advertising techniques in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to advertise. While exemplary programming languages, names and/or examples are chosen herein as representative of various choices, these languages, names and examples are not intended to be limiting. One of ordinary skill in the art will also appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the advertising techniques of the present invention, e.g., through the use of a software object, data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to one or more of the figures. While for purposes of simplicity of explanation, in some cases, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. While exemplary embodiments refer to utilizing the present invention in the context of particular programming language constructs, the invention is not so limited, but rather may be implemented in any language to provide the disclosed embodiments for advertising methods. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for providing third party participation in an electronic online advertising exchange advertising transaction, comprising:
   receiving, at a computing device, a publishing entity electronic communication representing an ad placement ask price and associated publisher transaction data and associated one or more publisher requirements;
   receiving, at a computing device, an advertising entity electronic communication representing an ad placement bid price and associated advertiser transaction data and associated one or more advertiser requirements;
   determining, at a computing device, a match of the one or more publisher requirements with the one or more advertiser requirements, where there exists a mismatch between the ad placement bid price and the ad placement ask price;
   storing information contained in the advertising and publishing entities electronic communications;
   providing, at a computing device, dynamic electronic access to the stored information to a third-party;
   receiving, at a computing device, a third party electronic communication indicating the third party decision to consummate an advertising transaction between the publisher and advertiser by contributing at least a portion of the mismatch between the ad placement bid price and the ad placement ask price; and
   delivering a benefit to the third party when a user clicks on an advertisement that is displayed as part of the advertising transaction, wherein the benefit is a portion of the amount paid by the advertiser to the publisher for the user click.

2. The method of claim 1, wherein the stored information includes one or more additional online advertising exchange information stores.

3. The method of claim 2, wherein the one or more additional online advertising exchange information stores includes one or more of demographic data, historical transaction data, exchange participant performance data, online advertising exchange audience member data, and online advertising exchange performance statistics.

4. The method of claim 1, wherein the step of storing information further comprises:
   storing information in a format to preserve online advertising exchange participant and user privacy.

5. The method of claim 4, further comprising:
   creating the format to preserve online advertising exchange participant and user privacy through the use of one or more of one-way hashing techniques and n-ary trees.

6. The method of claim 1, further comprising:
   providing access to the third party to online advertising exchange value add brokers to assist the third party in determining whether to consummate the advertising transaction.

7. A method to share online advertising risk, comprising:
determining a publisher ask price for an advertising space;
determining an advertiser bid price for the advertising space, wherein the ask price is more than the bid price;
identifying, at a computing device, that the publisher ask and the advertiser bid is an undervalued online advertising transaction for the advertising space, wherein an undervalued online advertising transaction comprises a potential transaction where a mismatch between an ask price and a bid price exists;
assuming, by a third party arbitrageur to the undervalued online advertising transaction, the risk of the undervalued online advertising transaction, wherein the third party arbitrageur assumes the risk by paying the ask price to the publisher and receiving the bid price from the advertiser; and
rewarding the third party arbitrageur for assuming the risk when the undervalued online advertising transaction succeeds, wherein the online advertising transaction succeeds when a conversion results, and wherein the reward is a portion of the amount paid by the advertiser to the publisher for the conversion.

8. The method of claim 7, wherein the risk assumption means includes one or more of the underlying undervalued online advertising transaction data, information sources external to the online exchange means, and online exchange value add brokers.

9. The method of claim 7, wherein the method further comprises protecting, at a computing device, exchange advertising transaction data through one or more of one-way hashing techniques and n-ary trees.

10. The method of claim 9, wherein the method further comprise receiving, at a computing device, one or more exchange advertising transaction data privacy preferences.

11. The method of claim 7, wherein the third party arbitrageur assumes less than the total risk of the transaction.

* * * * *